United States Patent
Nims

(10) Patent No.: US 7,639,838 B2
(45) Date of Patent: Dec. 29, 2009

(54) MULTI-DIMENSIONAL IMAGES SYSTEM FOR DIGITAL IMAGE INPUT AND OUTPUT

(76) Inventor: Jerry C Nims, 7530 S. Spaulding Lake Dr., Atlanta, GA (US) 30050

( * ) Notice: Subject to any disclaimer, the term of this patent is extended or adjusted under 35 U.S.C. 154(b) by 1064 days.

(21) Appl. No.: 10/652,025

(22) Filed: Sep. 2, 2003

(65) Prior Publication Data

US 2004/0135780 A1 Jul. 15, 2004

Related U.S. Application Data

(60) Provisional application No. 60/406,953, filed on Aug. 30, 2002.

(51) Int. Cl.
*G06T 15/00* (2006.01)
(52) U.S. Cl. ........................ 382/103; 345/419
(58) Field of Classification Search ................. 382/103; 345/419
See application file for complete search history.

(56) References Cited

U.S. PATENT DOCUMENTS

| | | | |
|---|---|---|---|
| 4,131,342 A * | 12/1978 | Dudley | 352/43 |
| 5,751,927 A | 5/1998 | Wason | |
| 5,795,154 A * | 8/1998 | Woods | 434/87 |
| 5,977,979 A * | 11/1999 | Clough et al. | 345/422 |
| 6,023,277 A * | 2/2000 | Osaka et al. | 345/419 |
| 6,198,484 B1 | 3/2001 | Kameyama | |
| 6,249,285 B1 * | 6/2001 | Madden et al. | 345/419 |
| 6,256,035 B1 | 7/2001 | Katayama et al. | |
| 6,297,825 B1 * | 10/2001 | Madden et al. | 345/419 |
| 6,329,963 B1 | 12/2001 | Chiabrera et al. | |
| 6,353,457 B2 | 3/2002 | Uomori et al. | |
| 6,438,260 B1 * | 8/2002 | Robinson | 382/131 |
| 2001/0052899 A1 * | 12/2001 | Simpson et al. | 345/419 |
| 2002/0021832 A1 * | 2/2002 | Dawson | 382/154 |
| 2002/0105514 A1 * | 8/2002 | Roche, Jr. | 345/419 |
| 2002/0121336 A1 * | 9/2002 | Karszes et al. | 156/277 |
| 2002/0191841 A1 * | 12/2002 | Harman | 382/154 |
| 2008/0246759 A1 * | 10/2008 | Summers | 345/420 |

FOREIGN PATENT DOCUMENTS

WO   WO/02/11070   *   2/2002

* cited by examiner

*Primary Examiner*—Charles Kim
*Assistant Examiner*—Stephen R Koziol
(74) *Attorney, Agent, or Firm*—Patton Boggs LLP

(57) ABSTRACT

A two-dimensional image is displayed and a grey level image is drawn on said two-dimensional image defining a depth map. A stereo image pair is generated based on the depth map and an anaglyph image of the stereo image pair is displayed. Edits of the depth map are displayed by anaglyph image. A plurality of projection frames are generated based on the depth map, and interlaced and printed for viewing through a micro optical media. Optionally, a layered image is extracted from the two-dimensional image and the plurality of projection frames have an alignment correction shift to center the apparent position of the image. A measured depth map is optionally input, and a stereo pair is optionally input, with a depth map calculated based on the pair. The user selectively modifies the calculated and measured depth map, and the extracted layers, using painted grey levels. A ray trace optionally modifies the interlacing for optimization to a particular media.

5 Claims, 17 Drawing Sheets

MULTI-DIMENSIONAL IMAGES SYSTEM FOR DIGITAL IMAGE INPUT AND OUTPUT

DESCRIPTION

Priority of this application is based on U.S. Provisional Application No. 60/406,953, filed on Aug. 30, 2002, which is hereby incorporated by reference.

FIELD OF THE INVENTION

This invention relates generally to a method and apparatus for three-dimensional viewing and, more particularly, to inputting, formatting, processing and fixing image information for three-dimensional viewing through a lenticular medium.

DESCRIPTION OF THE RELATED ART

Human vision employs two eyes spaced approximately four inches apart. The spacing provides each eye with a slightly different viewing position, whereby each eye sees a slightly different image, the difference between the two being generally referenced as "parallax". The human brain's processing of this parallax is a significant reason for our perception of depth when observing a scene, in other words, for humans seeing in three dimensions.

When a picture is taken through a conventional camera, however, there is no parallax information available. It is not available because the conventional camera has only a single lens and, hence, each picture reflects a single viewing position. The camera does not have a "left eye" lens and a "right eye" lens. Conventional printing and video display methods impose a similar shortcoming, because if two pictures were taken from two respective positions, and then printed or displayed by such conventional methods, there would be no discernible parallax because a conventional photographic print presents the same image to both of a persons' eyes.

The above-described loss of parallax occurs on images captured by a movie camera, digital or analog, and on conventional digital camera images. Likewise, a conventional video display, either a cathode ray tube (CRT) or light-emitting diode (LED) screen, displays the same image to the viewers' left and right eye and, hence, the parallax is lost.

There are, however, known methods for preserving or simulating parallax and for displaying it to a viewer.

The anaglyph method is one of the known methods for obtaining images corresponding to an actual observer's left eye and right eye image, and presenting at least some of the parallax, or difference, between the images to another viewer's eyes. A typical anaglyph method takes a picture of a scene from a first, or left eye position, and a picture of the same scene from a second, or right eye position. The difference between the left eye and right eye image may, for example, be the average lateral spacing between a person's left eye and the right eye, or interpupillary distance, which is about four inches.

The left eye image and the right eye image are then digitized and input into, for example, a general-purpose programmable computer. The left eye image is then transformed, using known digital image processing methods, such that all of its constituent colors fall within an optical band centered about the color red. The right eye image is likewise transformed, but in a manner such that all of its constituent colors fall within an optical band centered about the color blue. Assignment of red to the left eye image and blue to the right eye image is by design choice, as the colors may be reversed.

The red image is then displayed, or printed, in a manner substantially superimposed on the blue image. To the unaided eye the image appears as an out-of-focus red-blue image, because it is two images superimposed on each other, each having a different alignment of its respective objects.

The viewer then places a pair of "3-D" glasses over his or her eyes, the left lens being a red filter and the right lens being a blue filter. The left lens allows only the left, red-centered, image and the right lens allows only the right, blue centered image. Since the left image and the right image differ by a parallax corresponding to the difference between the first observational position and second observational position, respectively, the viewer sees a three-dimensional image.

There are, however, shortcomings with the anaglyph method. One is that it requires the "3-D" glasses. Many users find these uncomfortable to wear for extended periods. Another shortcoming is the color shifting of the left and right images, to red and blue, respectively. This significantly changes and reduces the range of colors of the viewed three-dimensional image. Another shortcoming is that the method can use only a single left eye, or red image, and a single right eye or blue image. Therefore, regardless of the viewer's position with respect to the display or the print, his or her left eye will continue to see the same left eye image and his or her right eye will continue to see the same right eye image. A result is that the scene may appear unnatural.

Another method for preserving or simulating parallax and thereby presenting an image to appear three-dimensional is the lenticular method. The lenticular method has some similarity with the anaglyph method in that two pictures may be taken from positions spaced apart by, for example, four inches. However, an optical principal different than anaglyph is used to present the left eye image to only the viewer's left eye and the right eye image to only the viewer's right eye. More particularly, in a typical example, the left eye image and the right eye image are digitized and input into, for example, a general-purpose programmable computer. The digitized left eye image and right eye image are then rasterized and interlaced with one another. The interlacing is typically in an alternating arrangement, with the first line of the left eye image extending alongside and parallel to the first line of the right eye image, followed by the second line of left eye image and the second line of the right eye image, also extending parallel and side-by side.

The interlaced image is then printed on, for example, paper or is printed on a back surface of a lenticular lens sheet. If the interlaced image is printed on paper a lenticular sheet is adhered to the paper. The lenticular sheet typically comprises a plurality of semi-cylindrical lenses, or lenticules, extending side-by-side, each lens extending along a respective center axis, with a particular spacing between adjacent center axes. The number of lenses per inch (LPI) is the inverse of the spacing in inches.

The spacing of the printed rasterized lines of the interlaced images is set relative to the LPI of the lenticular sheet. The interlaced raster lines are then printed on, for example, a paper on which the lenticular sheet is overlaid, or printed directly on the sheet. The raster lines are printed such that each raster line extends along a line spaced a particular amount from the center axis of a respective lenticule. The spacing is such that when the viewer looks at the lenticular sheet from at least one viewing position, all of the left image raster lines are refracted to impinge on the viewer's left eye and all of the right image raster lines are refracted to impinge on the viewer's right eye. The viewer's left eye and right eye thereby see different images, the difference being the parallax between the image taken from the camera at the first observational position and the image taken from the camera from the second observational position. As a result, the viewer sees a three-dimensional image.

The lenticular method may be used when there is only one original image, in other words when there is no left eye and right eye, i.e., stereo, image pair. This is a typical occurrence when a person takes a photograph through a conventional single lens, single image plane camera.

A typical method is to calculate or synthesize a stereo image pair from a single image. This can be performed by labeling, for purposes of example, the original image as the left eye image. The objects or parts of objects in the scene are then segmented and assigned to layers. An example is a picture of a boy standing on a beach next to a sandcastle. The boy is one object, the sandcastle another, and the remainder of the beach, waterfront and sky the third. A three-layer image may be constructed, the layers labeled as the foreground plane, the subject or key plane, and the background plane, respectively.

One object, such as the boy, is placed on the foreground plane. Another object, such as the sandcastle, is placed on the subject or key plane, and the remainder of the beach scene is placed on the background plane. The pixels corresponding to the boy would be placed on the foreground plane, the pixels corresponding to the sandcastle on the subject or key plane, and the pixels corresponding to the beach front and sky on the background plane. Viewed from the front the image would appear identical to the original, or left eye, image. Next, the general purpose programmable computer calculates the alignment of the boy, and of the sandcastle, when viewed from an imaginary right eye observational position.

A right eye image is then generated by shifting the pixels in the foreground plane, which are the pixels corresponding to the boy, a first distance laterally, and shifting the pixels in the subject or key plane a second amount.

Pixels in the foreground block or obscure pixels of the same position in the subject plane, which block pixels in the background plane. The shifting however, makes "visible" portions of the background and subject plane which were not visible in the original photograph. These are calculated and filled in by averaging adjacent pixels.

When the right eye image is completed by shifting pixels in the original or left eye image, the two images are rasterized, interlaced and printed onto, or overlaid with, a lenticular sheet as described above. The viewer then sees a three-dimensional image.

There are difficulties encountered in processing and formatting a two-dimensional image for viewing as a three-dimensional image through a lenticular medium. One difficulty is that the objects in the image must be placed on particular depth planes. This is necessary to calculate the parallax between the left image and right image in each stereo image pair. A related difficulty is that the optimum number of planes in the depth direction depends on numerous factors, including the type of lenticular screen, the size of the image, the distance from which the image will be viewed through the lenticular screen, and the particular type, size and relative positions of the objects in the original scene. Therefore, the user must be sophisticated enough to calculate this number, or a default number must be used which may not be optimal for all situations.

The above problems can become particularly troublesome because the desired three-dimensional quality provided by the processing cannot be observed until the processing is completed and the rasterized, interlaced image is printed on a lenticular screen. One reason that printing is required is that conventional computer displays do not include, or are not compatible with, lenticular screens. Conventional computer displays are not compatible with lenticular sheets because of the directionality of the screen, and compatibility of the screen LPI with existing display dot spacing. Further, even if a computer display were equipped with a lenticular screen, many of the layering and depth issues are related to the particular lenticular screen through which the image is actually viewed. Therefore, an image that appears acceptable through such a computer display lenticular screen may appear unacceptable when printed on or viewed through the lenticular screen end product. A still further problem is that troubleshooting may be difficult, because of difficulty in determining whether a problem is due to the layering and shifting operations or the computer monitor screen.

Accordingly, use of a lenticular media typically requires a "trial-and-error" method for seeing what the three-dimensional image will look like. This in turn typically entails repeated runs of determining the number of depth layers, selecting the depth spacing or apparent depth spacing between the layers, assigning objects to layers, rasterizing, interlacing and printing. This may be costly in terms of time and material. Time may be considerable because, for small quantities, inkjet printing must be used. Further, computer processing requirements for rasterizing and interlacing the images for viewing through a lenticular screen are high. Costs may be considerable, as lenticular sheets are typically much more expensive than standard paper, and inkjet printing necessarily consumes ink cartridges.

A further shortcoming with existing layering methods for generating stereo image pairs result in an image which, viewed through a lenticular media, appears as a plurality of flat cardboard cutouts arranged at varying distances relative to the viewer.

A still further shortcoming with existing lenticular methods is a lateral shift of the apparent position of objects when the three-dimensional image is viewed through the lenticular sheet. The lateral shift may be particularly troublesome when producing commercial advertisement materials.

The above problems are further compounded when multiple viewing angle three dimensional lenticular viewing is desired. The phrase "multiple viewing angle lenticular viewing" is used herein to reference the generation of multiple stereo pairs, each reflecting a left eye and a right eye view from a different viewing center-line viewing position, where "center-line" is an axis bisecting and normal to an inter-pupillary line segment. The stereo images are formatted and printed onto a lenticular medium in the same manner as used for a single stereo pair, the difference being a greater number of interlaced images and a greater number of raster lines under each lenticule.

SUMMARY OF THE INVENTION

The present invention advances the art and overcomes the above-identified shortcomings in addition to providing further benefits and features described herein.

An example embodiment of a system according to one aspect of the invention includes a general purpose programmable computer having a data processor, a data storage resource accessible by the data processor, a program resource accessible by the data processor, a display, a user command input interface accessible by the data processor, and a printer accessible by the data processor. An input image file program in the program resource includes instructions for the data processor to select from one or more image files in the data storage in accordance with commands received through the user command input interface, and to present through the video display a two-dimensional image corresponding to the selected image file.

For this description "program", "program storage resource" and "data storage resource" are each defined to include, but not be limited to, their respective customary meanings in the computer and image processing arts.

The program resource includes an object depth assignment program for instructing the data processor to receive a visual attribute command, having a user selectable value representing depth, from the user command interface, and assign a value to a visual attribute of a selected region of the displayed two-dimensional image, the selection of, and the location and form of the selected region and the value of the visual attribute based on the visual attribute command. The object depth assignment program further includes instructions for the data processor to display the region with a two-dimensional characteristic corresponding to the value. A left-right stereo pair generation program in the program resource includes instructions for the data processor to generate a left-right stereo image file based on the user input visual attribute commands.

The program resource also includes an anaglyph display program for instructing the data processor to display an anaglyph visual image on the display corresponding to the left-right stereo image file.

A rendering program associated with the program resource includes instructions for the data processor to generate a rasterized and interlaced image file, based on the left-right stereo image file, formatted for printing on a provided printer and a provided lenticular medium, and to output the rasterized and interlaced image file to the printer for printing on the provided lenticular medium.

An example embodiment of a system according to a further aspect of the invention includes a general purpose programmable computer resource, an input image file program, an object depth assignment program and a left-right stereo image file generating program which may, for example, be according to the above-summarized first aspect. An example system according to this further aspect includes a synchronized shutter display program for displaying a left image and a right image, in an alternating manner, and for generating a viewing synchronization signal synchronized with the alternating display. Synchronized shutter goggles receive the viewing synchronization signal and, in response, blocking one of a viewer's left eye and right eye from viewing the display while allowing the other of the left eye and right eye to view the display, in a manner synchronized with the viewing synchronization signal.

A rendering program associated with the program resource includes instructions for the data processor to generate a rasterized and interlaced image file, based on the left-right stereo image file, formatted for printing on a provided printer and a provided lenticular medium, and to output the rasterized and interlaced image file to the printer for printing on the provided lenticular medium.

An example of a first method includes displaying an image representing a two-dimensional image file, receiving a visual attribute command, the attribute command defining a contour of a region and having a user selectable value representing depth of the region, into a data processor. The example method displays the region with a two-dimensional characteristic corresponding to the depth value. A left-right stereo image file is generated based on the user input visual attribute commands. An anaglyph display file is then generated based on the left-right stereo image file, and an anaglyph three-dimensional image corresponding to the anaglyph display file is displayed. Upon receipt of a user-entered rendering command a rasterized and interlaced image file is generated, the file being formatted for printing on a provided printer and a provided lenticular medium. An image corresponding to the rasterized and interlaced image file is printed, by the provided printer, on the provided lenticular medium.

A method according to a further aspect includes, in addition to the above-features, steps of storing a plurality of image files, receiving a sequence selection command from the user identifying two or more image files from the plurality, and selecting the plurality and assigning each to an ordered image file. A further method received user commands defining a depth map for at least one of the layers.

A still further method receives a user command identifying a key subject plane or layer and, based on a calculated parallax, generates a layer offset value for at least one layer of at least one projection plane. The layer offset value is calculated such that a key object in the printed image corresponding to an interlacing of the projection frames appears at a predetermined location.

A further method is in accordance with one or more of the above-summarized methods and receives at least one stereo image pair and calculates a calculated depth based on the stereo image pair. A further aspect receives user commands selecting projection frame generation from between a user-entered depth map and the calculated depth map.

Another method is in accordance with one or more of the above-summarized methods and further receives micro optical model information, and micro optical parameter information and, based on the micro optical model information and micro optical parameter information, generates a ray trace data. The projection frames are interlaced for printing in accordance with the ray trace data.

Still another method is in accordance with one or more of the above-summarized methods and receives a measured depth map. A user command then selects projection frame generation from between a user-entered depth map and the measured depth map.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE EMBODIMENTS

Figure 1:
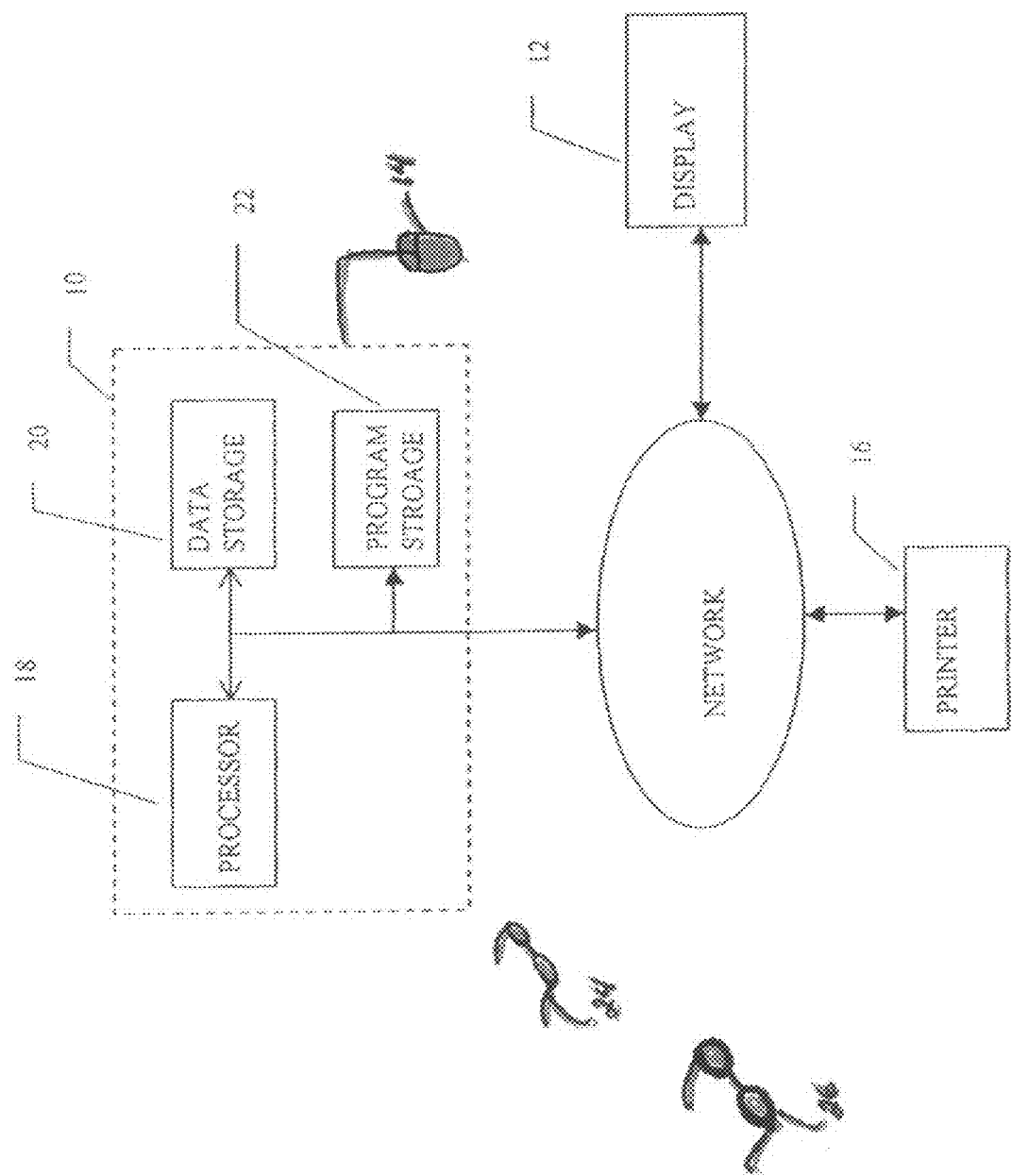
FIG. 1 is a functional block diagram of a system according to the present invention.

Referring to FIG. 1 a first example system will be described. The FIG. 1 example includes a processing resource 10 connected to a display 12, a user command input interface 14, and a printer 16. The processing resource 10 includes a data processor 18, a program storage resource 20 and a data storage resource 22. The processing resource 10 may be an off-the-shelf general-purpose programmable computer, such as is available from numerous vendors. An example is a Dell Optiplex™ personal computer (PC), having an Intel Pentium IV or equivalent processor, 256 Mbytes of random access memory (RAM), a DVD-CD disc drive, and a 60 GByte internal magnetic disc drive, running under, for example, the Microsoft Windows XP™ operating system. The Dell Optiplex™ is merely an example implementation of the processing resource 10. Other implementations include, for example, an Apple G4 iBook™ or Powerbook™ computer, running under Apple's OS9 "Classic" or OSX™ Unix-type operating system. Still another example is a Pentium-based or PowerPC-based personal computer running under the Linux™ operating system. The processing resource 10 is not limited to implementation as a single hardware unit or as hardware at a common physical. For example, the processor resource 10 may be a server-client arrangement.

Referring to FIG. 1, a user, labeled PS, sits in front of the display 12, with a pair of red-blue anaglyph viewing glasses 24 available for selective use. Red-blue anaglyph glasses are available from numerous commercial vendors.

Red-blue anaglyph glasses 24 are a preferred embodiment because they are readily available, typically have a low cost, and are generally tolerated by most computer users, especially for the short duration use required in practicing the present invention. Further, anaglyph glasses work with substantially any color cathode ray tube display (CRT) or color light emitting diode (LED) display screen. Anaglyph glasses, however, are not the only implementation contemplated by this invention. Alternative embodiments include, for example, synchronized shutter goggles 26 in place of the red-blue anaglyph glasses. Synchronized shutter goggles and the software drivers for use with conventional personal computers with CRT displays are readily available from various commercial vendors.

Figure 2:
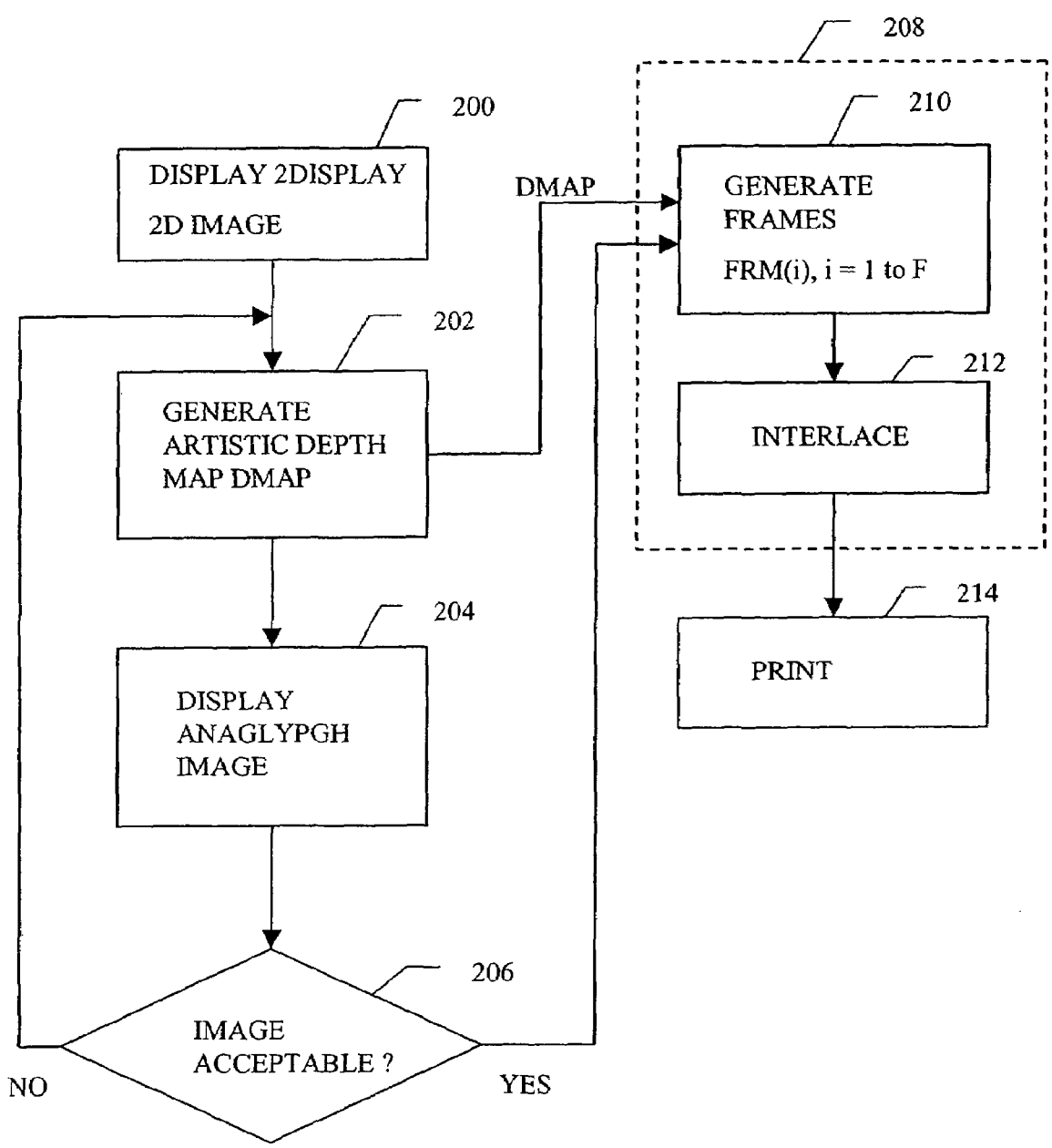
FIG. 2 is an example functional block diagram of a first aspect of the described method.
Figure 3:
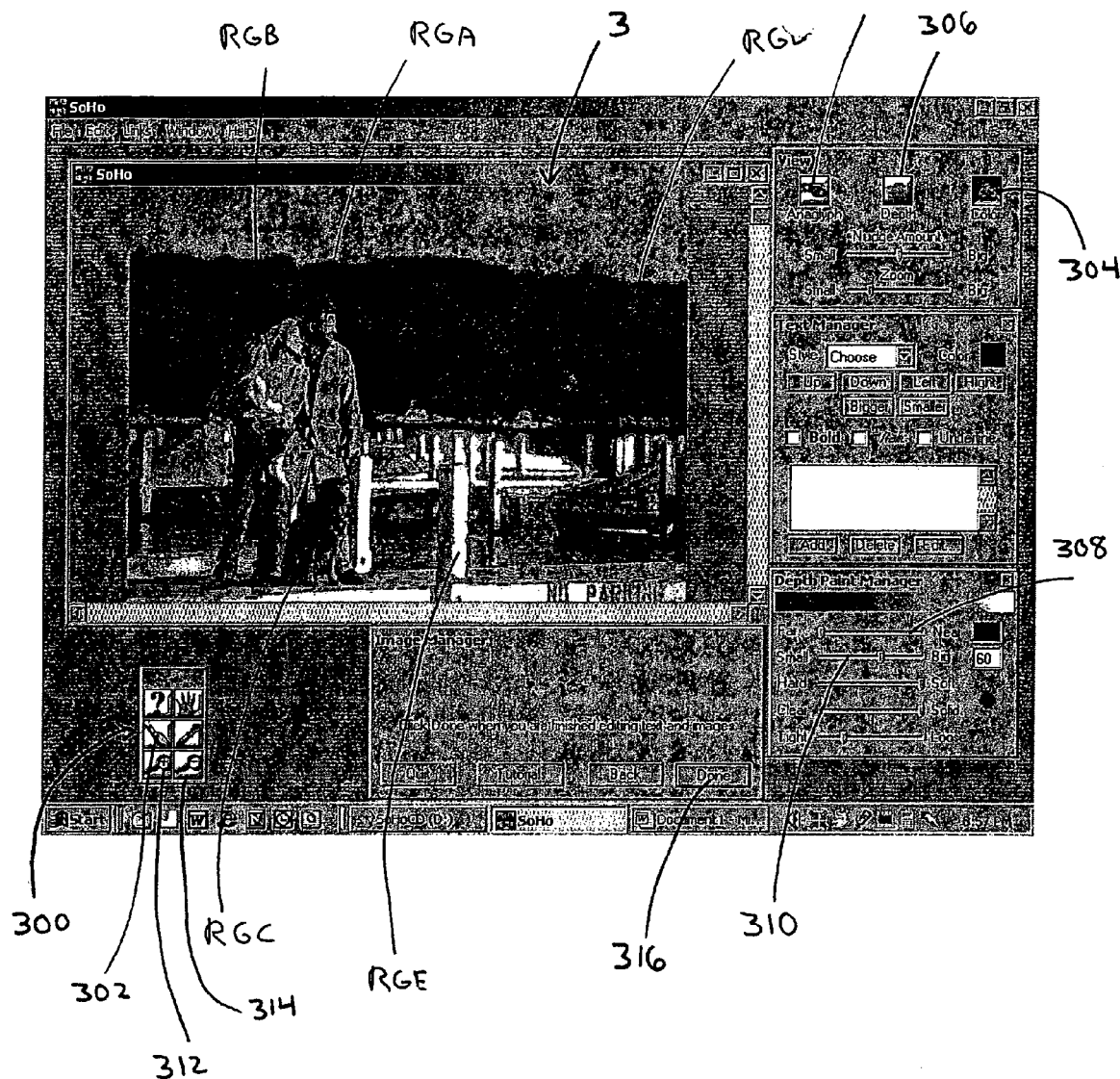
FIG. 3 shows an example two-dimensional image displayed for processing according to FIG. 2 and an example graphical user interface for entering commands received during an operation according to FIG. 2.

FIG. 2 is a functional block diagram of an example operation according to a first aspect of the methods described herein. An example operation according to FIG. 2 will be described in reference to the above-described example FIG. 1 system. Referring to FIG. 2, the operation begins at step 200 by displaying an image, labeled 2DISPLAY, corresponding to a pixel image file 2DIMAGE. An example 2DISPLAY image 3 is shown in FIG. 3. The 2DIMAGE may be stored within the processing resource 10, in which case step 200 retrieves the 2DIMAGE file from a data storage such as, for example, the resource 22 of FIG. 1. Unless otherwise stated, or otherwise understood from the context, references to operations on the 2DISPLAY image reflect associated operations on the 2DIMAGE that is represented. It will also be understood that the computer resource 10 will typically be configured to maintain an unaltered version of the 2DIMAGE.

The step 200 display may include further steps of inputting the 2DIMAGE file, or a parent file (not labeled) having information for the processing resource 10 to generate or extract the 2DIMAGE file. Since the 2DIMAGE file is pixel-based, the step 200 display may further include steps of decompressing, reformatting or translating the 2DIMAGE file from an input or stored format such as, for example, .jpg, .mov, or .tif. Further, step 200 may include image enhancement, such as removal of graininess, filling of defects, and removal of red-eye. These may be performed using conventional off-the-shelf image processing software products such as, for example, Adobe PhotoShop™.

Generating the 2DIMAGE file represented by the 2DISPLAY image may be in accordance with any known method for generating a digital image file. For example, the 2DIMAGE file, or the file from which the 2DIMAGE file is reformatted or decompressed, may be generated by a digital camera, or it may be a scanned and digitized image of a conventional photograph, or may be downloaded from, for example, the Internet. The display step 200 may also, as identified above, include selecting the 2DIMAGE file from among a plurality of pre-stored image files (not labeled). Further, the 2DIMAGE file may be a computer-generated image file and, as another option, may represent a composite of a plurality of images. An example composite image is an image of a person overlaid on an image of a beach. Portions of the composite image may be computer-generated. Techniques and commercially available consumer image processing products for generating and arranging such composite images are well-known in the art.

FIG. 3 includes an example graphical user interface (GUI) for a user to perform step 200 by searching or browsing through a plurality of image files, stored in the data storage 20 (FIG. 1) and selecting a particular file by, for example, placing a cursor over an OPEN graphical user interface button and selecting to open the particular image file.

Figure 4:
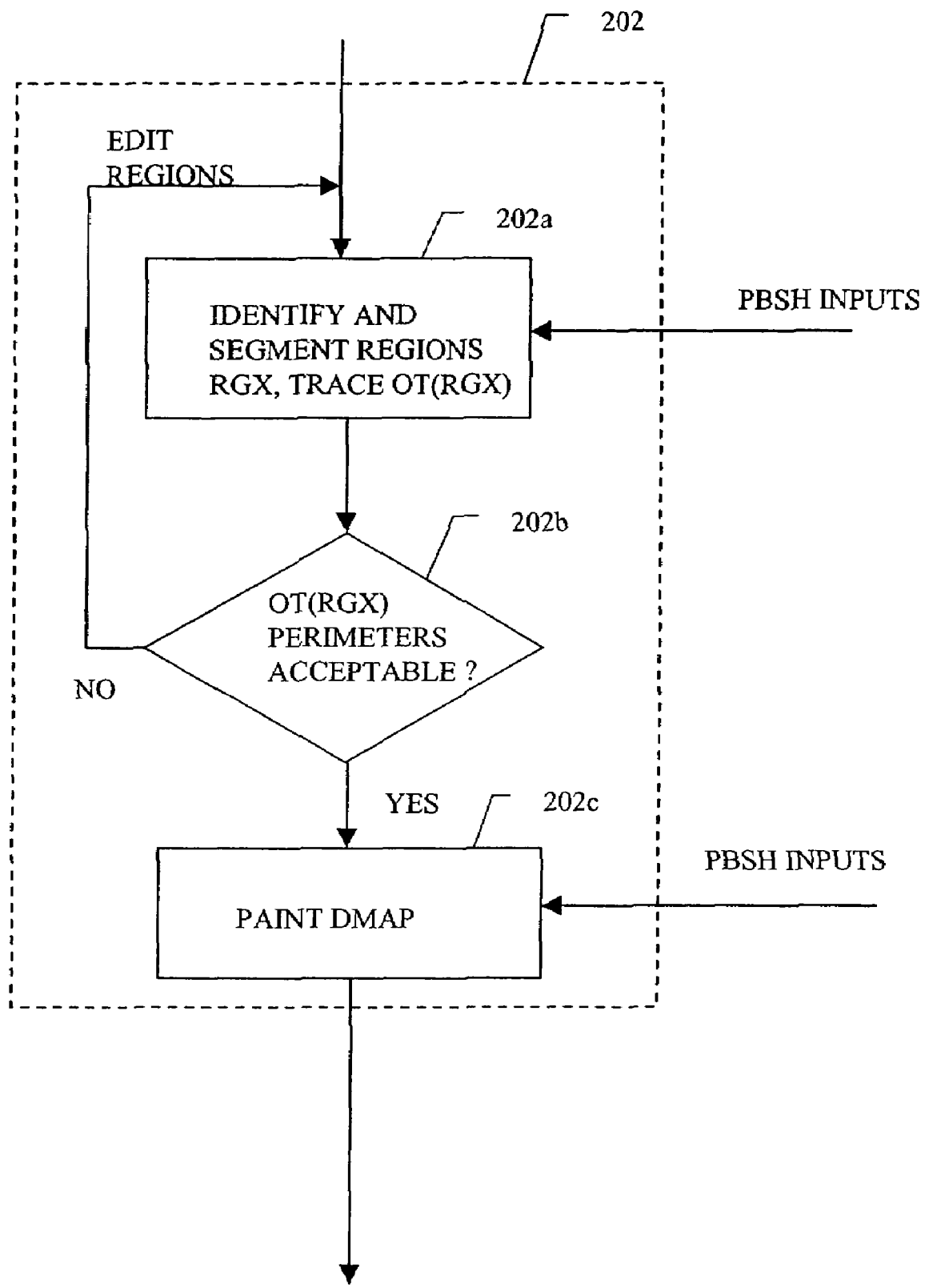
FIG. 4 is an example detailed functional block diagram of the artistic depth map generation block of FIG. 2.

After displaying the 2DISPLAY image the user goes to step 202 to generate an artistic depth map, referenced as ADMAP. The ADMAP is used for generating three-dimensional image files for display on the display 12 and for printing on a lenticular media, as described further below. FIG. 4 shows an example detailed functional block diagram for generating the artistic depth ADMAP. Referring to FIG. 4, the user begins at block 202a by inputting commands segmenting a plurality of regions within the displayed image 2DISPLAY. FIG. 3 shows example graphical user interface buttons for receiving the outlining commands from the user and these will be referenced for describing an example operation.

The regions formed by the user inputting commands at step 202a are referenced generically as RG, and specifically as RGX, with "X" having, for example, values of "A", "B", "C", and so forth. It will be understood that the RG and RGX labels are references of convenience for describing the process and its operations. In the preferred embodiment, the user does not need to be presented with, or have knowledge of, any referencing labels for regions or objects in the 2DISPLAY image.

Referring to FIG. 3, in the depicted example image 2DISPLAY, an example of RG regions identified by the user are the man RGA, the woman and child RGB, the dog RGC, a boat RGD and the front pier structure RGE. In this example, the remainder of the 2DISPLAY image is referenced as background RGBK. FIG. 3 shows the above-identified regions as surrounded by dashed lines, but for this example these are reference lines and are not part of the 2DISPLAY.

As stated above, the preferred embodiment does not require the end-user to have knowledge of referencing labels, such as RGX, for the regions. Instead, the end user simply identifies regions of the 2DISPLAY image that he or she wishes to appear at a distinct depth viewed through a lenticular or other microlens media, and then enters commands that will cause the regions, and portions of the regions, to appear at selected depths, as described below.

Referring to FIG. 4, as the user identifies regions RG at block 202a he or she inputs commands to the computer resource 10 to segment each from the remainder of the 2DISPLAY image. An example step 202a segmentation is by the user drawing or tracing an outline OT(RGX) around each of the regions RGX, except for the background region RGBK. The RGBK region does not have to be outlined in this example because it will keep the default ADMAP DEPTH value of absolute background, as described below.

The FIG. 3 GUI shows a utility tool bar 300, having a paintbrush button PAINT BUTTON 302 as one of its tools. Assuming for this example that the user command input interface 14 of the processor resource 10 is a mouse, the display cursor 303 moved by that mouse (not shown) becomes a paintbrush PBSH by the user clicking the cursor on the PAINT BUTTON 302. The PBSH shown in FIG. 3 is, like most of the GUI features of this invention, a design choice. An example cursor is a "+" image, as this was found less distracting while being moved than an image of, for example, a paintbrush.

The paintbrush PBSH of this example is used to paint an outline OT (RGX) around each of the identified regions RGX, and to fill in the outlined regions, which is described below in reference to step 202c. The step 202a and 202c operations of the paintbrush PBSH define what is termed herein as an "artistic depth map," or ADMAP file. An example ADMAP file is an M'×N' pixel file, where M' and N' correspond to the M and N, respectively, of the M×N 2DIMAGE file. The ADMAP file is maintained in, for example, the data storage resource 22 of the processor resource 10. The ADMAP pixel values represent a relative depth, and the values are set by the user sweeping the paintbrush PBSH over the 2DISPLAY.

For this example it will be assumed that M=M' and N=N', meaning that for every pixel in the 2DISPLAY image there is one corresponding pixel in the ADMAP file. This is not a limitation, as contemplated variations would set M' equal to, for example M/4 and N' equal to N/4. The M/4 and N/4 example would map each ADMAP pixel value to a depth of a four pixel by four pixel region in the 2DISPLAY.

An example operation is described as setting all ADMAP pixels corresponding to, or mapping to, any particular RGX region of 2DISPLAY to the same depth value. However, setting all ADMAP values within each region RG to the same value will typically result in a three-dimensional image which, when seen on the display 12 and as seen through a lenticular or other micro optical media, appears as an arrangement of flat images, resembling cardboard cutouts spaced in a three-dimensional arrangement. The cardboard cut-out appearance may resemble the above-identified shortcoming of the prior art layering techniques. Therefore, as will be described further below, in a preferred operation according to FIGS. 2 and 4 the user varies the DEPTH values for different sub-areas of regions RG. Further, it will be understood that the user is not required to define actual discrete regions RG within the 2DISPLAY. The user may instead use the paintbrush PBSH to paint an artistic depth map ADMAP having a gradation of DEPTH values, with no actual bounded discrete regions RG. As will be understood, the painted ADMAP can yield an image which, after the further described processing and printing, appears as a three-dimensional arrangement of rounded images, having a lifelike appearance not provided by prior art layering techniques. This is typically superior to the layering techniques of the prior art, which generally produce images appearing as flat cardboard cut outs.

Referring to FIG. 4, preferably, the original 2DISPLAY image provided by step 200 remains accessible for user viewing during the step 202a segmentation operation. This permits the user to re-display the 2DISPLAY image for purposes of perspective during the object outlining. It also permits the user to clear and repeat the object outlining step 202a without having to re-load the 2DIMAGE file, or refresh the display. The FIG. 3 example GUI therefore includes a COLOR button 304 for displaying the original 2DISPLAY, and a DEPTH button 306 for displaying a DEPTHIMAGE visually representing the values of the ADMAP pixels.

With continuing reference to FIG. 4, a first aspect of step 202a stores and presents the DEPTHIMAGE as a black-and-white grey-scale image, the ADMAP pixel values having a grey-tone proportional to their depth value. The values are entered by the user setting the paint brush PBSH with a grey tone corresponding to a desired ADMAP depth value and then sweeping the PBSH over a particular portion of the 2DISPLAY. The FIG. 3 GUI shows an example DEPTH SLIDE slider 308 for setting the PBSH grey tone. In the depicted example, white represents the absolute background and black represents the absolute foreground. The white and black designations are only an example, and can be readily reversed. Slider GUIs are well-known in the general personal computer arts, and, therefore, description of the generation and implementation of the DEPTH SLIDE 308 is omitted.

It will be understood that, for this example, a region RGX is defined by the user tracing the PBSH around an object or area of the 2DISPLAY. It is contemplated that, for this particular example, a region RGX would be selected by the user identifying an object in the 2DISPLAY, or area of an object, or objects, which the user wishes to appear in the final end product, described in detail below, at depths different than that of surrounding objects or areas. As the user traces the PBSH all ADMAP pixels corresponding to pixels of the 2DISPLAY image under the swath width SWIDTH of the PBSH are set to a depth value corresponding to the selected grey tone, i.e., DEPTH SLIDE value. Another example embodiment automatically identifies regions RGX using, for example, edge-extraction methods known in the art.

The SWIDTH value can be defined as, or as proportional to, a percentage of the 2DISPLAY image width. Referring to the FIG. 3 GUI, the end user does not need to know or be presented with a numeric "value" for SWIDTH and, instead, may adjust the value using the example SWATH slider GUI 310. The physical range of the SWIDTH is a design choice, with the FIG. 3 example having a range of 0% through 100% relative to a default value. A default value could be, or correspond to, for example, fifty pixels of the 2DISPLAY which, for this example, would also be fifty pixels of the DEPTHIMAGE.

For purposes of efficiency, the SWIDTH value is preferably set by the user according to the operation being performed. For example, for tracing peripheries and contours of the FIG. 4 step 202a outlining, a narrower width is typically preferable. On the other hand, for filling of regions as in the example PBX regions of step 202c, a wider SWIDTH is typically preferable. Preferably, for ease of use, the user is presented with default SWIDTH values for particular operations. An example is 10% for the step 202a tracing, 33% for medium area fills, and 75% for larger area fills of step 202c. For purposes of this description, "fill" means inputting a command, such as by moving the PBSH to "paint" a region RGX, to set all of the pixels in the corresponding DEPTHIMAGE, and hence set the ADMAP information, to a desired DEPTH value. Assuming that the 2DISPLAY has a physical size on the display 12 of, for example, four inches square, the 10% value can, for example, have a physical swath width approximately that of a rounded pencil tip. Assuming the same dimensions for the 2DISPLAY, a 33% can have an effective swath width approximately that of a standard pencil end eraser. It will be understood that these are examples and that the actual translation of the SWIDTH value to a physical diameter of the PBSH on the display 12 is a design choice.

Referring to FIG. 3, various methodologies for assigning and selecting cursor modes and its shape and appearance on the display 12 are known in the art of personal computers. Further, the specific displayed cursor shape and size in the particular GUI chosen for implementing this invention is a design choice. For example, the FIG. 3 GUI may be implemented such that the user must change cursor modes after, for example, the paintbrush PBSH mode for tracing the regions RGX, prior to clicking on the DEPTH button 306. Depending on design choice, the cursor may appear as a small paintbrush while in the PBSH mode, and as a conventional arrow when in other modes.

As described above, a region RGX is a region having an object, area of an object, or group of objects, which the user wishes to appear in the final end product, described in detail below, at depths different than that of surrounding objects or areas. A particular RGX may therefore include a plurality of actual visual objects or subjects in the 2DISPLAY image. For example, the man RGA, the woman holding a child RGB and the dog RGC shown in FIG. 3 could be identified as a single region RBX, which would be defined by the outer periphery of their combined image. Another alternative is that the user can identify the man, woman and child as a single region, RGX1, and the dog as another region, RGX2. As will be understood from the further description below, however, such a combined-object selection would limit the grouped objects to appearing at the same depth, both in the three-dimensional anaglyph image displayed at step 204 and the image seen through the final lenticular product. Therefore, for purposes of describing the aspects and operations of this invention, the man, the woman and child, and the dog will be identified, for this example, as separate regions RGA, RGB, and RGC, respectively.

With continuing reference to FIGS. 2, 3, 4 and 5, an example operation of the step 202a outlining of regions RGX will be described. Referring to FIG. 3, this example assumes that the user wishes the man RGA, the woman and child RGB, and the dog RGC to be at a near foreground position, the front pier section RGE to be in the foreground. It is also assumed that the user wishes the boat RGD to be further back than RGA through RGC, but not all the way back to the background RGBKND. The user sets ADMAP values to accomplish this by first clicking on the DEPTH SLIDER 308, which configures the paintbrush PBSH to set ADMAP at, for example, a 70% grey tone, where 0% is the background and 100% is the foreground. The user then, by moving the mouse or moving his or her finger on a trackpad (not shown), traces the PBSH "+" marker around each of the man RGA, the woman and child RGB and the dog RGC. Since the front pier section RGE was chosen to be in the foreground, the user clicks on the DEPTH SLIDER 308 again, moving the PBSH ADMAP value to 100% grey scale, and traces around the front pier section RGE. The user then clicks on the DEPTH SLIDER 308 again, sets the PBSH to the ADMAP value of 50% grey scale, and traces around the boat RGE. The remainder of the 2DISPLAY image is background RGBKND which, for this example, is represented by ADMAP values at the 0% grey scale, or white value.

Preferably the FIG. 3 GUI includes a zoom feature for the user to zoom in on selected areas of the 2DISPLAY image, to more accurately trace the OT(RGX) contour with the paintbrush PBSH. An example zoom feature is shown as the zoom-in button 312 and zoom-out button 314 on FIG. 3.

It will be understood that the FIG. 3 GUI layout is only an example selected for describing operations of the example embodiments. Other GUI layouts for entering commands and data described herein are readily implemented. For example, a two-button mouse feature may be included, by which the user clicks on the right button (not shown) to display one or more mode or parameter options while carrying out the segmenting by tracing the OT(RGX) perimeters. An example of this would be a right click to present GUIs (not shown) having the function of the DEPTH SLIDER 308 and the SWATH slider 310 but, referring to FIG. 6, not requiring the user to move the cursor from the 2DISPLAY region. Further, the above description of step 202a using a mouse and cursor GUI arrangement is only for purposes of example. A trackpad may be used for moving the cursor. A touch-screen (not shown) may be used as well.

With continuing reference to FIG. 4, after completing the above-described outlining using the paintbrush PBSH, the user may proceed to step 202b to view and inspect the outlines OT(RGX) created by the PBSH strokes. In this example a DEPTH DISPLAY image representing the DEPTHIMAGE is selectively displayed on the display 12, or other viewing apparatus (not shown). The user selects this view by, for example, entering a command through the FIG. 3 GUI to view the DEPTH IMAGE. Referring to FIG. 3, an example is clicking on the DEPTH GUI button 306. In response, the computer resource 10 goes to step 202b to display a DEPTH DISPLAY image representing the DEPTH IMAGE.

Figure 5:
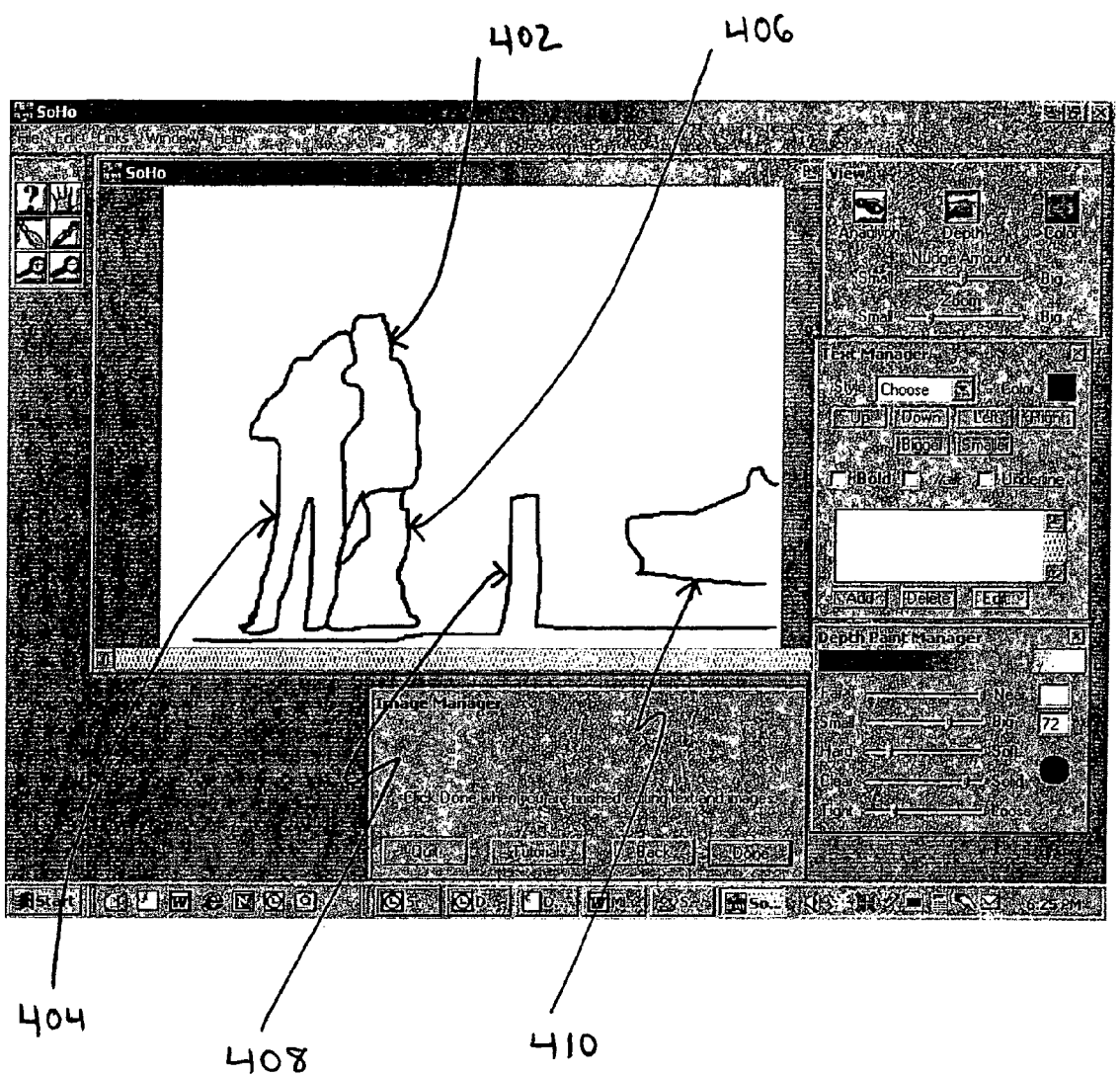
FIG. 5 depicts an example display of user-entered commands setting depth map values for the example FIG. 3 image according to the example operation of the FIG. 2 method, the display showing commands outlining regions for further entering of depth map commands.

FIG. 5 is an example DEPTH DISPLAY presented to the user at step 202b, showing the DEPTH IMAGE created by the user tracing the paintbrush cursor "+" around each of the man RGA, the woman and child RGB, the dog RGC, the front pier section RGE, and the boat and remaining pier section RGE. The outline of the man, OT(RGA), is labeled 402, the outline of the woman and child, OT(RGB), is labeled 404, the outline of the dog, OT(RGC), is labeled 406, the outline of the front pier, OT(RGE), is labeled 408, and the outline of the boat OT(RGD), is labeled 410. The OT(RGX) outlines have different respective grey levels as established by the DEPTH value of the PBSH when they were drawn.

For this example, OT(RGA), OT(RGB), and OT(RGC) have each been set to 70% grey level, meaning their respective regions have been identified as having an ADMAP level corresponding to the near foreground. OT(RGE), corresponding to the outline of the front pier region RGE, is in the nearest foreground, therefore having a grey level of 100%. OT(RGD), corresponding to the outline of the boat and remaining pier section, has a grey level of 50%, placing it between the foreground and background.

Referring to FIG. 4, if at step 202*b* the user is not satisfied with the outlines OT(RGX) the user may click on the above-described FIG. 3 GUI buttons to edit the ADMAP. The editing may be performed by maintaining the display of the DEPTH IMAGE, which represents the depth map ADMAP, and then using the above-described modes and features of the paintbrush PBSH to change selected outlines OT(RGX). The editing may include erasing the ADMAP by setting the paintbrush to PBSH to its maximum width, its DEPTH value to the background, and then swiping the paintbrush over the entire DEPTH IMAGE display. Referring to the FIG. 3 example GUI, an example sequence for erasing is clicking on the GUI button 302 to reconfigure the cursor as the paint brush PBSH, clicking on the DEPTH SLIDER 308 to set the ADMAP value of the paintbrush PBSH at full background, or 0%, and then moving the PBSH cursor, i.e., the "+" mark, to effectively erase the portions he or she wishes changed. The user may wish to click on the SWATH slider 310 and set the SWIDTH to, for example, 50%, to expedite the "erasing." Alternatively, the FIG. 6 GUI 3 could be modified to include an eraser button (not shown) which the user would click to set the ADMAP value of the paintbrush PBSH such that swiping it on the DEPTH IMAGE, would reset all DEPTH IMAGE pixels to their default ADMAP value.

Figure 6:
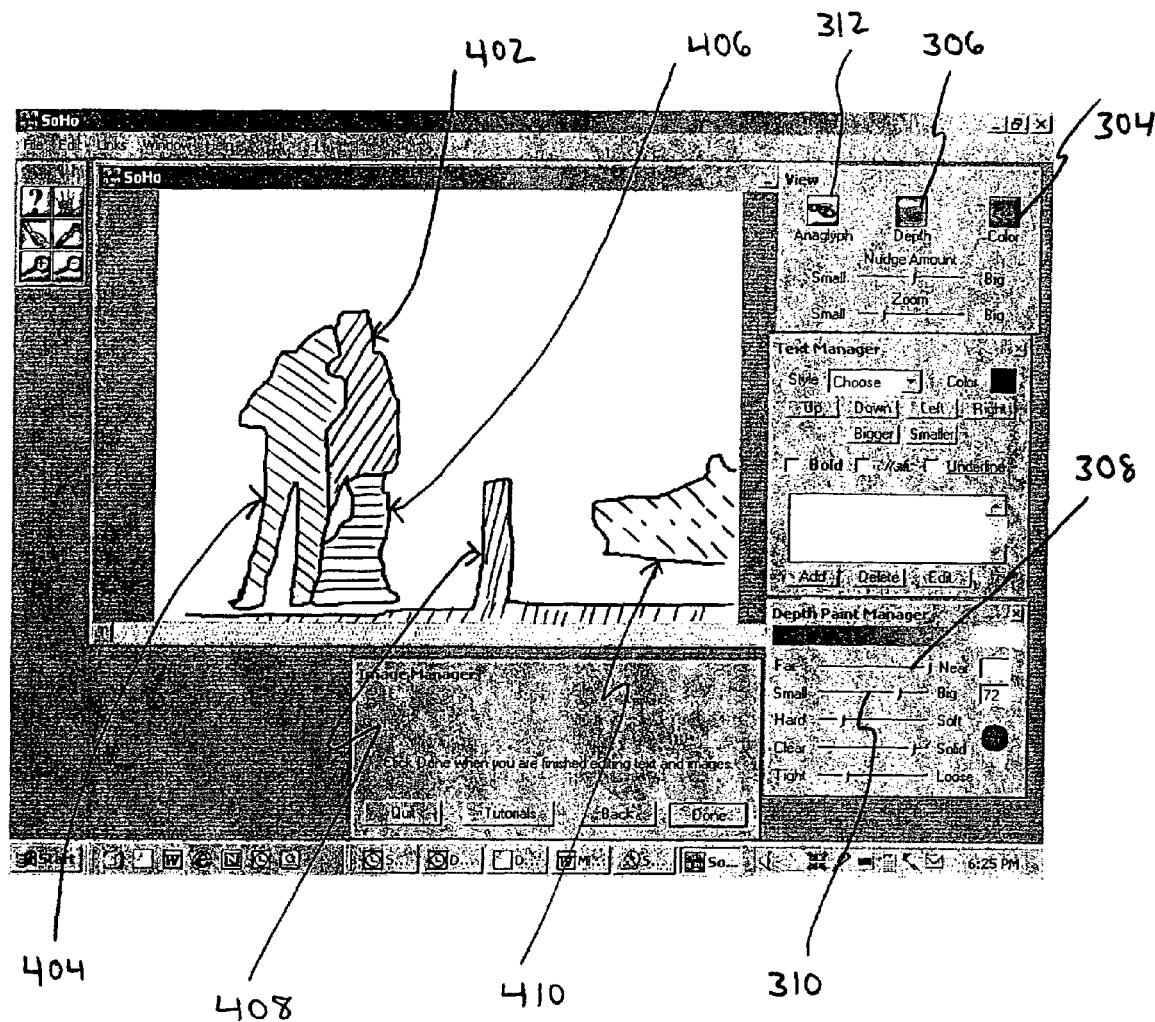
FIG. 6 depicts an example display of the FIG. 7 display after an example of entering of further user-entered regional depth commands.

Referring to FIG. 6, after the erasing operation, the user clicks on the DEPTH SLIDER 312 again to set the PBSH to the value desired for the renewed outline tracing. The user may also re-set the SWIDTH to a narrower value by clicking on the SWATH slider 314 and moving it to, for example, 15%. The retracing can be done directly on the displayed DEPTHIMAGE, or the user can click on the COLOR button 304, which re-displays the 2DISPLAY image, and then perform the tracing. The repeating of the tracing step 202*a* is represented on the FIG. 4 flow chart as the EDIT REGIONS flow arrow.

With continuing reference to FIGS. 2 and 4, if, upon viewing the DEPTH IMAGE, at step 202*b* the user finds the outlines OT(RGX) acceptable, the user proceeds to step 202*c* to set the interior of each ADMAP region, as represented by the DEPTHIMAGE display of the outlines OT(RGX). A basic operation of step 202*c* sets the ADMAP regions defined by the outlines OT(RGX) to a uniform DEPTH value which is the same as the DEPTH value of the outline itself. This basic operation is only an example, as the ADMAP can be set so that DEPTH values vary within a particular outline OT(RGX). Varying the DEPTH value within a particular outline OT(RGX) allows the user to obtain a more lifelike, rounded three-dimensional image from later described steps.

A first example operation of step 202*c*, however, sets each ADMAP region defined by an outline OT(RGK) to a uniform DEPTH value equal to that of the outline. An example for the user setting these ADMAP values is by "painting" the interior of each RGX region using, for example, the paintbrush PBSH, with the ADMAP value set to the outline value OT(RGX). An operation of step 202*c* will be described using this example setting operation.

The operation of step 202*c* begins, for example, with the user clicking the cursor on the PAINT button 302 to ensure that the cursor is in the PBSH mode. The user may then pick, for example, the RGA region to paint first. In such an example the user would then input a command, or history of commands, setting the ADMAP value of the PBSH to the same value as the outline of RGA, or OT(RGA). The above-described example operation of step 202*a* sets the outline of the RGA region, OT(RGA), labeled 402, at an ADMAP or grey scale value of 70% which, for this example, is 70% toward the foreground. Therefore, to fill or "paint" the interior of OT(RGA) to this same ADMAP grey value, the user clicks on the DEPTH SLIDER 312, and sets the ADMAP to 70%.

To accelerate the operation, the user may wish to broaden the SWIDTH of the paintbrush PBSH for at least a portion of the painting operation. An example SWIDTH is 50%, which the user selects by clicking on the SWATH slider 314 and dragging it to the 50% position. The user then moves the PBSH cursor "+" to the interior of the OT(RGA) region 402, clicks and moves it around to paint as much of the interior area as possible without running over the line 402. To paint any remaining portion of the interior of line 402, the user may click on the SWATH slider 310 and narrow the PBSH width to, for example, 15%. The user repeats the operations of clicking on the SWATH slider 310 and the DEPTH slider 312 to paint the interior of each of the remaining regions RGX outlined at step 202 with the same ADMAP or grey scale tone of its peripheral trace OT(RGX).

FIG. 6 shows the DEPTH DISPLAY of FIG. 4 after completion of the above-described ADMAP painting operation. The RGX regions that are displayed to the user with a grey tone are represented in FIG. 6 by cross-hatchings.

Step 202*c* described above is only an example operation for setting the ADMAP value of the DEPTHIMAGE corresponding to each RGX region. One alternative embodiment automatically performs the setting by, for example, the user first clicking on the DEPTH SLIDE button 308 to set the DMAP value, clicking on a "fill" GUI button (not shown), moving the cursor to an interior of an OT(RGX) peripheral outline and then, by clicking the mouse or by other command input, entering an "execute" command. The computer resource 10 in response locates all pixels of the DEPTHIMAGE corresponding to the region RGX and sets all to the DMAP value.

In another alternative embodiment of step 202*c*, the computer resource 10 automatically sets the ADMAP or grey scale value of the paintbrush PBSH according to the ADMAP of the OT(RGX) outline of the region set in step 202*a*. An example operation is the user clicking the "fill" or equivalent button, or sequence of GUI buttons, whereupon the processing resource 10 reads the ADMAP value of the outline OT(RGX) and sets all DEPTHIMAGE pixels interior to that outline to that value. Software identifying regions or pixels interior to a peripheral line and setting these to a given value, or to have a given texture or appearance, are readily implemented by persons skilled in the arts pertaining to this disclosure and, accordingly, further detailed description is omitted. As also known to such persons, the software implementing this operation may be simplified by imposing a rule on the segmenting step 202*a* requiring the outlines OT(RGX) to form a closed periphery.

In a still further alternative embodiment, the DEPTH SLIDE is not a continuous scale but, instead, is a plurality of discrete values.

Another alternative embodiment does not associate the outlines OT(RGX) with a DMAP depth value. Instead, the outlines OT(RGX) are a dimensionless demarcation superimposed on the DEPTH DISPLAY image as, for example, a black line but having no DMAP depth value of its own. The filling or painting operation 202*c* described above then defines the ADMAP value for regions of the DEPTHIMAGE interior to the dimensionless OT(RGX) outline.

A further alternative embodiment substitutes a software-based edge-extraction step for step 202a, or augments step 202a to assist the user in defining the outlines OT(RGX). Numerous edge-extraction methods are known in the related art of image processing, and software packages for performing edge extraction are available from various commercial vendors. The boundaries (not shown) in the 2DISPLAY image defined by the edge extraction operation could, for example, be imported into the DEPTHIMAGE. The user would, for example, view the boundaries at step 202b, edit them as described above if required, and then use the boundaries to guide him or her in the ADMAP filling or painting operations described in reference to step 202c above.

Referring to FIG. 2, when the user has completed the ADMAP setting operation 202, the process goes to step 204 to generate a VSTEREO image pair. The VSTEREO image will be used for the step 206 preliminary viewing of a three-dimensional image that is based on the 2DISPLAY image and the depth map ADMAP generated as described above. The VSTEREO pair comprises, for this example, the 2DISPLAY image and a generated PRLAX image. Generation of the PRLAX image will be described in reference to FIG. 8.

Figure 8:
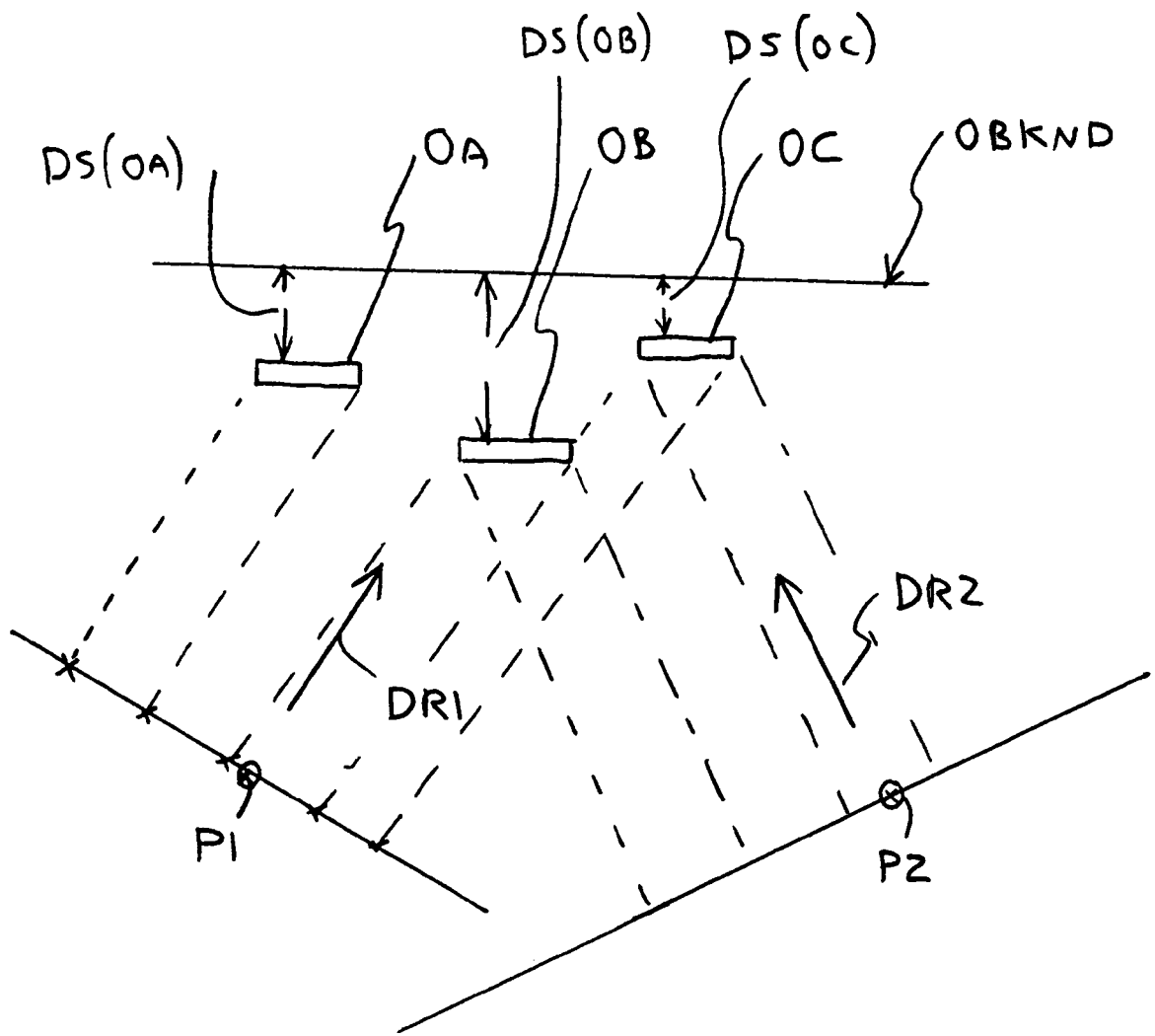
FIG. 8 depicts an example display of a graphical user interface for receiving a user-entered command for generating a rasterized and interlaced output file, based on the user-entered regional depth commands represented by FIG. 6 or FIG. 7, for printing on a lenticular medium.

Referring to FIG. 8, graphical objects OA, OB, and OC are graphical representations of objects, or portions of objects, corresponding to the above-defined regions RGA, RGB and RG, respectively. The objects OA, OB and OC are not drawn to scale and, instead, are arranged for purposes of depicting the VSTEREO generation. Each of the objects OA, OB, and OC is shown spaced from the background plane OBKND by a distance DS(OX), X=A, C. The distance DS(OX), X=A, C corresponds to the ADMAP value of the RGX region, which is DMAP(RGX), X=A, C. Plane OBKND corresponds to the RGBKND region of the 2DISPLAY image which, for the described example, is all areas of the 2DISPLAY image not segmented into separate regions RGX.

Referring to FIG. 8, the 2DISPLAY image is a two-dimensional projection of the objects OA, OB and OC viewed from viewing position P1. The calculated PRLAX image is a two-dimensional projection of objects OA, OB and OC as if viewed from a viewing position P2. An example DP is approximately four inches, which is approximately the interocular distance of the average adult. Assuming the 2DISPLAY image to be a "left eye" view, the PRLAX image at a DP of four inches is, or is an approximation to, the view that would be seen through a person's right eye.

With continuing reference to FIG. 8, the vectors DR1 and DR2 are the projection axis for the 2DISPLAY and PRLAX image. The calculated PRLAX image contains a projection of the OX region as seen along the DR2 vector. The projections of the OX regions calculated for the PRLAX image are referenced as RGX', where "X" in this example ranges from "A" to "C". The relative positions, or alignments, of the RGX's projections of the OX regions onto the PRLAX image are shifted from the relative positions of the RGXs in the 2DISPLAY image. The shifts reflect the parallax caused by the PRLAX image being seen from a different, i.e., right eye, viewing position. Calculation of the shift of each RGXP region in the PRLAX image with respect to its position in the 2DISPLAY image is based on the region's depth DMAP value. The amount of shift depends on the DMAP value, i.e., the relative depth, of the RGX region. For this example the background RGBKND is not shifted.

The generation of the PRLAX image is carried out by the computer resource 10, using software-based instructions applying known geometric optics algorithms, to calculate the shifts of the RGX regions to obtain the new right eye position two-dimensional projection.

The step 206 generation of the VSTEREO frame pair is described referencing the original image 2DISPLAY as the left eye image and the generated PRLAX image as the right eye image. Variations are contemplated, including assigning an alternative embodiment 2DISPLAY as a center image. Two parallax images are then generated—one shifting the regions RGX to the left, by a distance dependent on their depth position or ADMAP value, and the other shifting regions RGX to the right. The two generated parallax images form the VSTEREO frame pair.

As known in the art, the pixel or region RGX shifts for generating the PRLAX image from the 2DISPLAY image may cause pixels in a first RGX in front of a second RGX, to be shifted onto, and hence cover, pixels or portions of the second RGX. The second RGX may be the background RGBKND. Similarly, pixels in a foreground region may, when shifted, "uncover" portions of the second RGX on the background RGBKND. The uncovered region may be filled in using any of the many interpolation methods known in the art of image processing.

After step 206 is completed, or after step 204 if 206 and 204 are performed concurrently, step 208 displays the VSTEREO frame pair for three-dimensional viewing. An example triggering event for proceeding to step 208 is the computer resource 10 receiving a command, 3DVIEW, from the user. Referring to FIG. 3, an example for inputting and receiving the 3DVIEW command is the ANAGLYPH GUI button 313. Step 208 then presents the VSTEREO frame pair such that one of the pair is substantially incident only on the viewer's left eye, and the other is substantially incident only on the viewer's right eye. An example for this operation of step 208 converts the VSTEREO image pair to a LEFTRED and RIGHTBLUE pair, LEFTRED being the 2DISPLAY image color shifted and filtered to lie within a red optical frequency band, and the RIGHTBLUE being the PRLAX image color shifted and filtered to lie in a blue optical frequency band. The LEFTRED and RIGHTBLUE images are then displayed concurrently on the display screen 12.

The user then, for this anaglyph display example, arranges the anaglyph glasses (not shown) such that the red optical band filter (not shown) covers his or her left eye, and the blue optical band filter (not shown) covers his or her right eye. The user then sees a three-dimensional image corresponding to the 2DISPLAY image, with objects or regions as segmented at step 204 appearing at differing depths. The depths correspond to the depth values ADMAP that the user previously assigned such as, for example, by the painting-in operation described for step 204.

Step 208 of FIG. 2 receives one or more commands from the user indicating if the three-dimensional image seen through the anaglyph glasses is acceptable. If the user determines the image acceptable he or she inputs a command to the computing resource 10, whereupon the process goes to steps 210 and 212 and generates an INTERFAZE image for fixing on a lenticular media, as described below. Referring to FIG. 3, an example for receiving command, to perform the rendering is the "Done" button 316, and clicking this to display the FIG. 8 GUI having a "Go" button 320. The FIG. 8 GUI includes further fields 322 and 324 which allow the user to define the size of the final image to be generated and printed on a micro lens material. The FIG. 8 example GUI further includes a field 326 for the user to input a retrievable storage identifier and store the ADMAP and VSTEREO image for later processing. The user, however, may find the three-dimensional image unacceptable. In such a case, he or she clicks the color button 304 on the FIG. 3 GUI to re-display the 2DISPLAY image and then re-executes, in whole or in part, steps 202, 204 and 206.

The step 206 generation of the PRLAX, and the step 208 anaglyph display are described above as separate steps performed after defining the ADMAP at steps 202 and 204. However, the described method contemplates performing steps 206 and 208 concurrently with the step 204 painting, i.e., setting the DMAP values of the RGX regions. Performing steps 204, 206 and 208 concurrently permits the user to view, in real time, the changes in apparent depth resulting from defining or editing the ADMAP in step 204.

Referring to FIG. 2, if the user finds the three-dimensional image acceptable he or she enters a command such as, for example, clicking the RENDER graphical user interface button on FIG. 3. Upon receipt of the RENDER or equivalent command, step 210 generates a plurality of frames FRM(i), i=1 to F, and step 212 rasterizes and interlaces the frames FRM(i), i=1 to F, into an INTERFAZE file for printing on a lenticular media. The parameter value F represents the number of frames FRM(i), and is either pre-loaded or calculated as described below. The INTERFAZE file is then printed by, for example, the user entering a PRINT command through a graphical user interface, whereupon the computer resource 10 outputs the INTERFAZE file, or a raster interface processor (RIP) version of the INTERFAZE file to the FIG. 1 example printer 16 for printing on a lenticular media.

The FIG. 2 aspect of the methods described herein preferably generates the frames FRM(i) at step 210 and the INTERFAZE file at step 212 using pre-defined software algorithms. For a basic embodiment, the user enters only a command data defining the lens-per-inch resolution of the lenticular material and the physical size of the desired printed image.

Step 210 generates F frames FRM(i), each frame being an image corresponding to the 2DISPLAY image, but with each of its pixels shifted based on the frame number and on the pixel's DEPTH value in the ADMAP. Each frame has a pixel dimension, referenced as FSIZE. Both F and FSIZE are either pre-calculated, and/or modified based on user inputs as described below. The generation of frames FRM(i) can be described in reference to each frame FRM(i) being a projection of the 2DISPLAY image as if "seen" from a particular viewing angle. The projection is calculated based on the above-described example ADMAP values painted by the user at step 202. More particularly, the ADMAP defines a depth position of each pixel in the 2DISPLAY image based on the DEPTH value of the ADMAP data painted in by the user. The frame FRM(i) projections are therefore obtained by a pixel-by-pixel shift of the 2DIMAGE file represented by the 2DISPLAY. The amount of shift depends on the DEPTH value, and on the viewing position for which the frame is generated. The operation can also be described by way of example.

An illustrative example assumes that only two DEPTH values were used in painting the ADMAP, namely 25% and 75%, with the remaining portion being 0% where, for this example, 0% is absolute background. All of the pixels having an ADMAP value of 75% are assigned to the near foreground, while all of the pixels having an ADMAP value of 25% are assigned further back toward the absolute background. The example assumes a frame count F of four. Example first and second frames FRM(1) and FRM(2) are "left eye" and "right eye" projections when viewing the 2DISPLAY plane from a first horizontal viewing direction, where "horizontal" assumes that the frames FRM(i) are calculated for lenticules extending in an up-down direction, and "viewing direction" is an imaginary vector bisecting a line segment connecting the left eye and right viewing position. An example third frame FRM(3) is calculated such that FRM(2) and FRM(3) represent a second "left eye" and "right eye" projection, based on viewing the 2DISPLAY plane from a second horizontal viewing direction. The second horizontal viewing direction may, for example, be normal to the 2DISPLAY image. Similarly, example frame FRM(4) is such that FRM(3) and FRM(4) are a third "left eye" and "right eye" projection. Typically, when comparing adjacent frames, e.g., FRM(1) and FRM(2), pixels closer to the foreground, i.e., having a higher DEPTH value, are shifted more than pixels in the background.

As described above, for the FIG. 2 example flow diagram, the frame count F is either read from memory or calculated prior to the frame generation 210. The frame count F is any integer greater than two, and is based on a number of variables, including the dots-per-inch resolution of the printer, the specific configuration of the lenticular media lenses, the intended viewing distance, and the type of raster image processor within the computer resource 10. The method therefore contemplates pre-calculating and prestoring a frame count F, and adjusting the count based on, for example, input commands from the user defining the lens resolution, in LPI, of the lenticular media.

An initial factor for the frame count F is the desired pixels per inch in each of the frames FRM(i), i=1 to F, and the lens resolution, e.g., LPI, of the lenticular media. The desired number of pixels in each of the frames FRM(i) is selected, in part, based on the general guideline that a larger number of pixels per inch in each of the frames provides a greater resolution in the image seen when through the lenticular media. This bounds the frame count F because, as will be understood, typically at least one pixel from each frame FRM(i) must lie underneath each lenticule of the lenticular media. Therefore, if F is equal to ten then at least ten pixels must lie under each lenticule.

In view of the above lenticular lens resolution, in LPI, and DPI resolution of the printer, a general guide for initially determining the frame count F is:

$$F=DPI/(LPI \times pf), \quad (1)$$

where pf=pixels per frame in the image printed on the lenticular media.

An example frame count F is four. Other example values of F, such as ten through twenty, are contemplated, and these ranges may be extended in accordance with future technological advances in lenticular media.

An example equation for calculating a frame count F that may be more closely optimized to a particular application is the non-closed formula, or methodology, FCOUNT:

$$\text{Frame Count}=F=FCOUNT(RIP, lc, dpi, vd), \quad (2)$$

where

RIP=raster image processor algorithm;
Lc=lens configuration (includes lens shape, thickness, material);
DPI=dots per inch of the output device;
Vd=viewing distance.

Equation (2) will be referenced further in the description of additional aspects and features of the present method.

Figure 7:
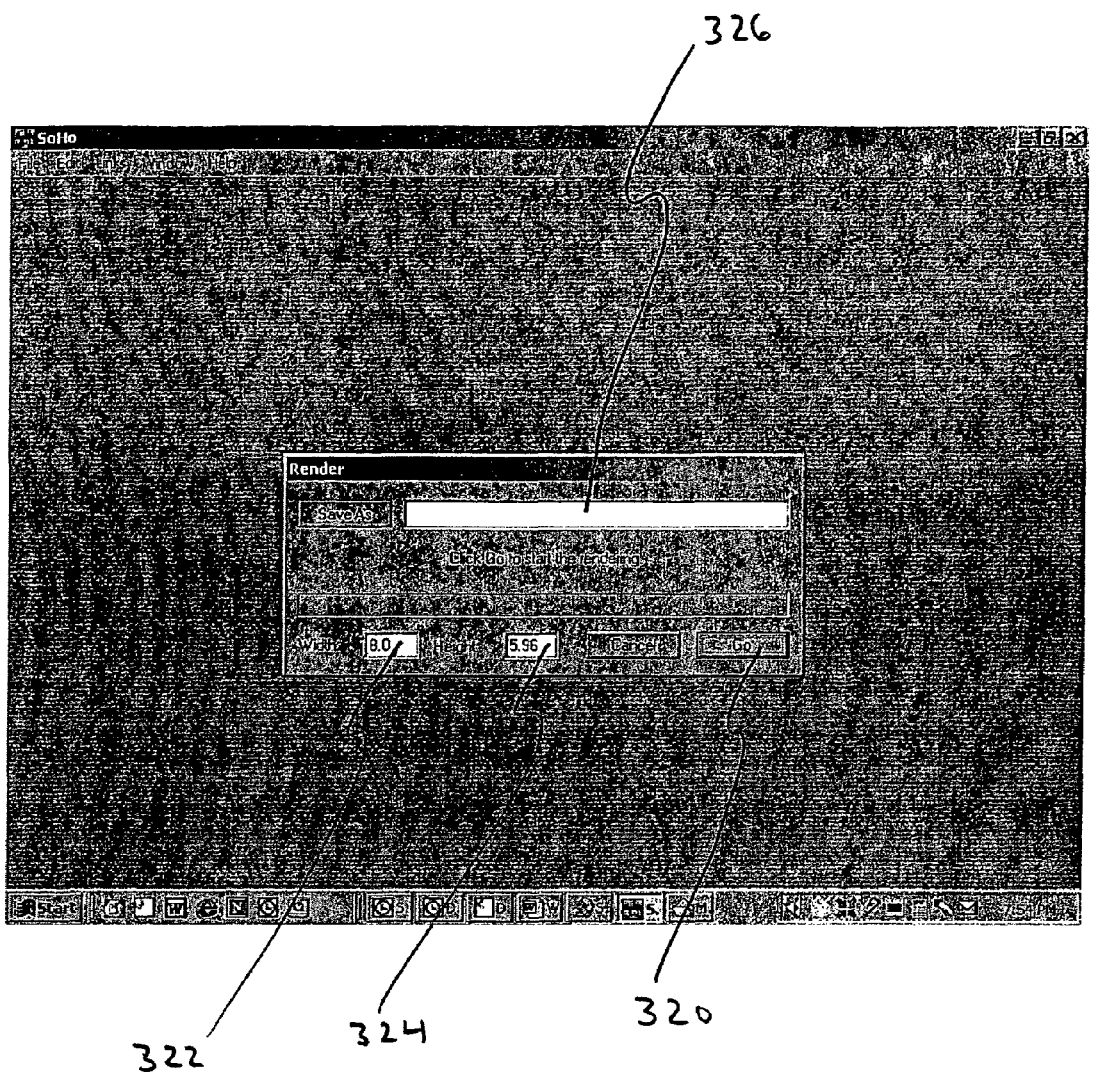
FIG. 7 is a graphical depiction of generating a stereo image pair for anaglyph viewing, based on the depth map generated in accordance with FIGS. 2 and 4.

As identified above, each frame has a pixel dimension FSIZE which, for a basic operation according to FIG. 2, is a precalculated number scaled according to the DPI resolution of the printer 16, the physical size of the image, such as entered into fields 322 and 324 of FIG. 7, and the frame count F. A more detailed description of FSIZE calculation and guidelines is described below in reference to additional aspects.

Referring to FIG. 2, after step 210 generates the frames FRM(i), for i=1 to F, the process goes to step 212 to interlace the frames FRM(i) into the INTERFAZE file. The frames FRM(i) have been sized to match the printer as described above. An example of the step 212 interlacing begins by taking a first row of pixels from each of the frames FRM(i), for i=1 to F, and places them side-by-side. A "row" extends in the direction that the lenticules of the lenticular media extend. Step 212 then takes a second row of pixels from each of the frames FRM(i), for i=1 to F, and places them side-by-side. Typically, the rows are placed side-by-side and spaced such that the first row of each of the frames FRM(i) will lie under the first lenticule (not shown) of he lenticular media, and the second rows from each of the frames FRM(i) lies under the second lenticule of the lenticular media. This process is repeated until the $N^{th}$ row of each frame FRM(i) is placed side-by-side to lie beneath the $N^{th}$ lenticule (not shown) of the lenticular media. The result is the INTERFAZE file.

With continuing reference to FIG. 2, the process then goes to step 214 and prints the INTERFAZE file for viewing through a lenticular or other micro optical media. The above-described calculations result in the rows of the INTERFAZE file matching the frequency and spacing of the lenses in the lenticular or other micro optical media.

It will be understood that the present method contemplates printing on microlens media other than conventional lenticular media having parallel extending lenticules. For example, the above-described interlacing operation 212 is readily modified to generate an INTERFAZE file matched to any lens system which can refract images such that one image, or portion of an image, is directed to a viewer's left eye and another portion is directed only to the viewer's right eye. Examples of such microlenses contemplated by the methods described herein include, but are not limited to, "fly eye" lenses, fresnel lenses, and aspherical lens systems.

Figure 9:
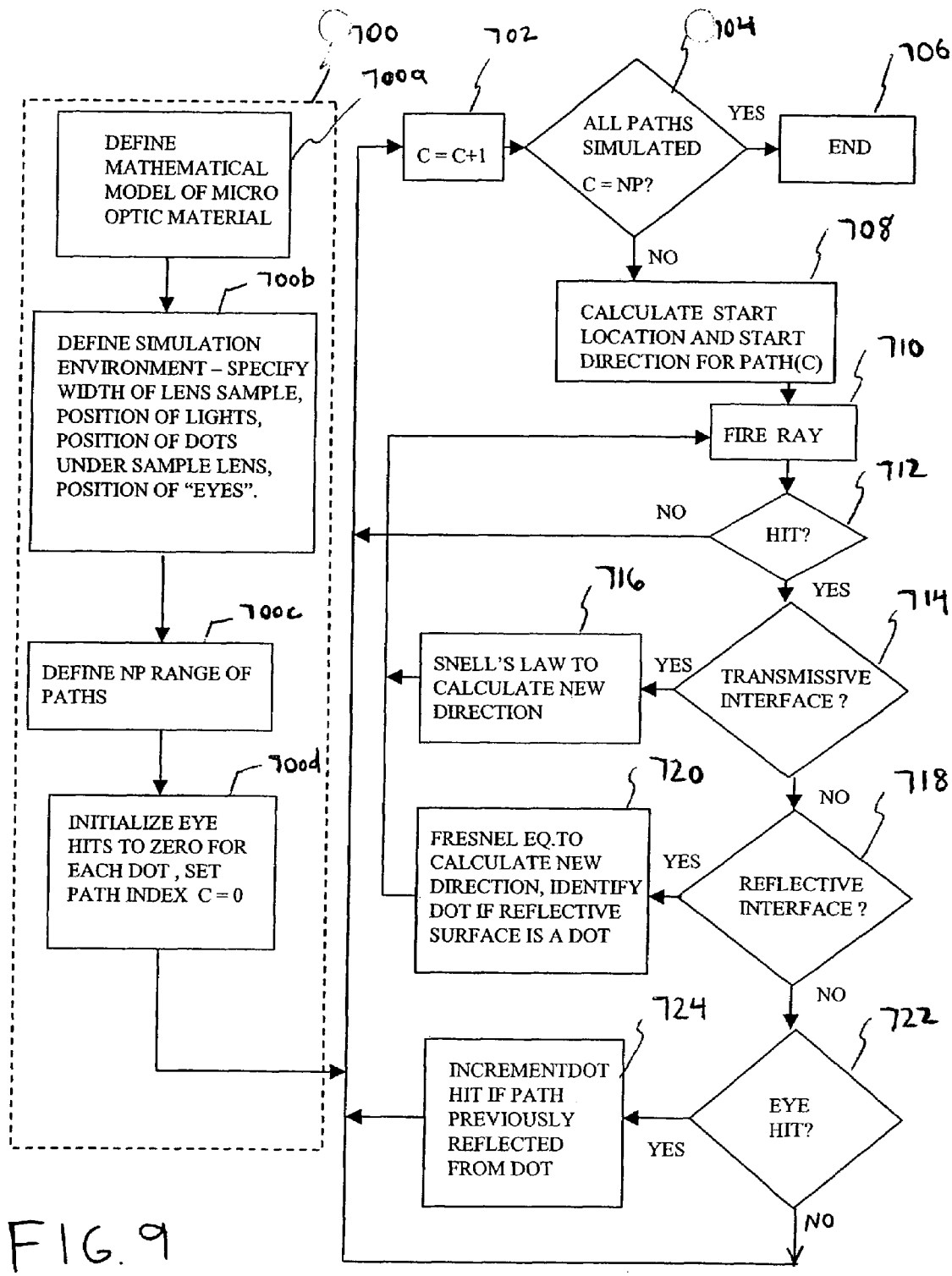
FIG. 9 is an example functional block diagram of a ray trace algorithm for adapting the interlacing to match specific micro optic media characteristics.

The above described aspect of the FIG. 2 generates the INTERFAZE file using a pre-loaded, or preconfigured instruction set that does not require input or configuration by the user other than entering the dimensions of the final image to be printed on the lenticular or other micro optical material. FIG. 9 shows an example block flow chart of a further aspect of the present invention, which generates optical model data for optimizing the above-described operation 212 interlacing to match the characteristics of specific microlenses. The FIG. 9 example block flow chart describes a ray tracing algorithm which "fires" rays from a virtual light into a virtual lens and detects, or calculates, its path with respect to a virtual eye. The path of the light ray is calculated until it either hits the virtual eye or hits nothing. The eye hits are sorted based on which dot was hit behind the lens.

Referring to FIG. 9, the ray trace process begins at step 700a by generating a mathematical model for the microlens. Generation of the mathematical model may be in accordance with known modeling methodologies, and is specific to the particular microlens. Parameters included in the model may include, but are not limited to, the LPI of the lenses, lens radius or parabolic ratio, overall lens thickness, lens layer thickness, and index of refraction for each layer. Next, step 700b sets the simulation environment or "scene". The "scene" includes specifying the width of the lens sample to be tested, the position of the "eyes" relative to the lens, the positions of the lights in the scene, and the set-up of the "dots" behind the lens. The set-up of the dots is in accordance with the dot per inch (DPI) resolution of output device.

Next, operation 700c defines the range of paths. The range of paths includes the geometric range, e.g., the conical angle in which the paths radiate, the relative direction, e.g., parallel or radial from a common origin, and the number of paths NP. Next, operation 700d initializes the hit count for each dot to zero and sets a path counter, such as C, equal to zero.

FIG. 9 depicts blocks 700a through 700d within a general initialization block 700. The order and arrangement of the blocks 700a through 700d is only for purposes of describing, by example, a typical set of initialization operations. Actual implementations may perform initialization operations in an order differing from that depicted, and may use other indexing and dimensioning schemes to reference the paths.

Continuing to refer to the example flow diagram of FIG. 9, after the above-described initialization operations the path index C is incremented at block 702. Block 702 is not a limitation in the method but, instead, is based on the example path index C. Other path indexing or identification schemes are readily identifiable by persons skilled in the art of computer modeling. After the C index is incremented, the example flow diagram checks, at block 704, if all of the paths have been simulated. The example checking operation is to compare the count C to a path number dimension NP. As with the example count C indexing scheme, the example block 704 checking operation is not intended as a limitation, as other checking schemes are readily identifiable by persons skilled in the art of computer modeling. If the block 704 determination is "yes", the process ends at block 706 and the results described below are analyzed to determine the amount or light reflected off each dot that is incident on each virtual eye. If block 704 determines that all paths have not been simulated then operation 708 calculates the starting location and start direction for PATH (C). For the example indexing scheme the first time through the loop sets C=1.

Next, operation 710 "fires" a simulated light ray, based on the starting position and direction calculated by operation 708. Operation 712 then determines if the ray "hit" any defined media-to-media interface in the model. Typical defined interfaces include: (a) a transmissive interface, such as between air and an outer surface of the modeled micro optical material, or between layers of the modeled micro optical material, (b) a reflective interface, such as between a surface of the modeled micro optical material and a modeled opaque dot on the surface, and (c) a virtual eye surface. The FIG. 9 example flow diagram shows block 712 as detecting if a hit occurs, and blocks 714, 718, and 722 as detecting if the hit identified by block 712 is one of the three types identified above. In an actual implementation blocks 712, 714, 718, and 722 may be a single operation.

Referring to the FIG. 9 example flow diagram, if the hit is identified as a transmissive interface operation 716 applies Snell's law to calculate a new direction for the path, starting at the location of the hit. Operation 716 uses the index of refraction of the materials at the transmissive interface entered into the model at block 700a. Operation 710 then fires a continuing ray from the location of the hit, using the new direction calculated by operation 716. Identification if a hit was from a reflective surface or interface is shown as operation 720, and this operation also identifies if the reflective interface is a surface of one of the modeled dots. If the reflective surface is a dot a flag or other data is set identifying that dot. The purpose of the flag is to identify, upon a ray hitting the virtual eye, whether it reflected off of a dot. Block 710 then fires another ray from the point the hit was incident on the reflective interface, using the direction calculated by operation 720. Operation 722 identifies if the hit was a virtual eye and, if so identified, operation 724 increments the number of hits received by the virtual eye for that particular dot. Hitting a virtual eye terminates the PATH (C) and, therefore, after operation 724 the process returns to block 702, increments the C counter, and simulates another Path (C).

Figure 10A:
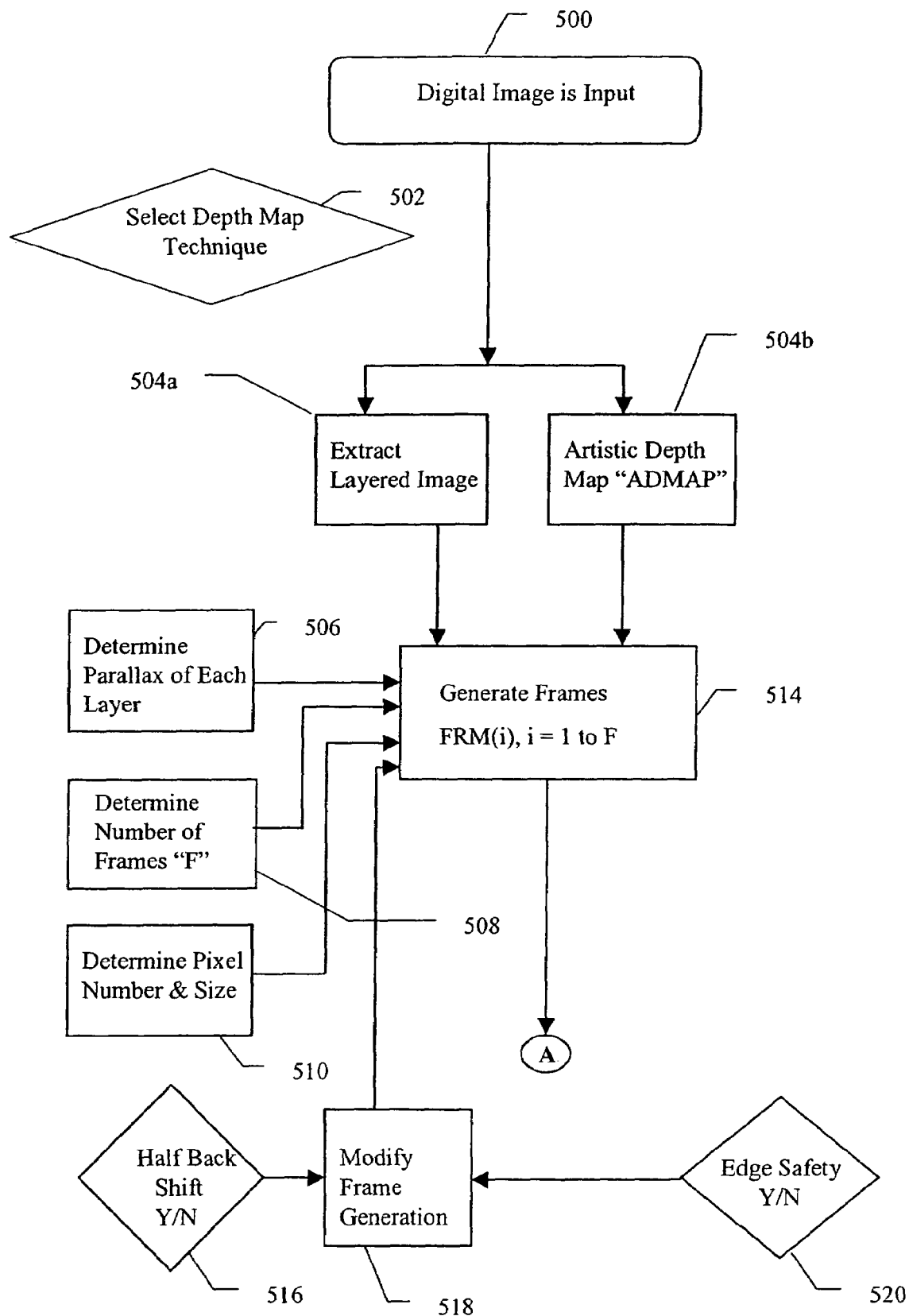
FIGS. 10A and 10B show an example functional block diagram of another aspect of the described methods including layer extraction and frame generation, and alignment correction.
Figure 10B:
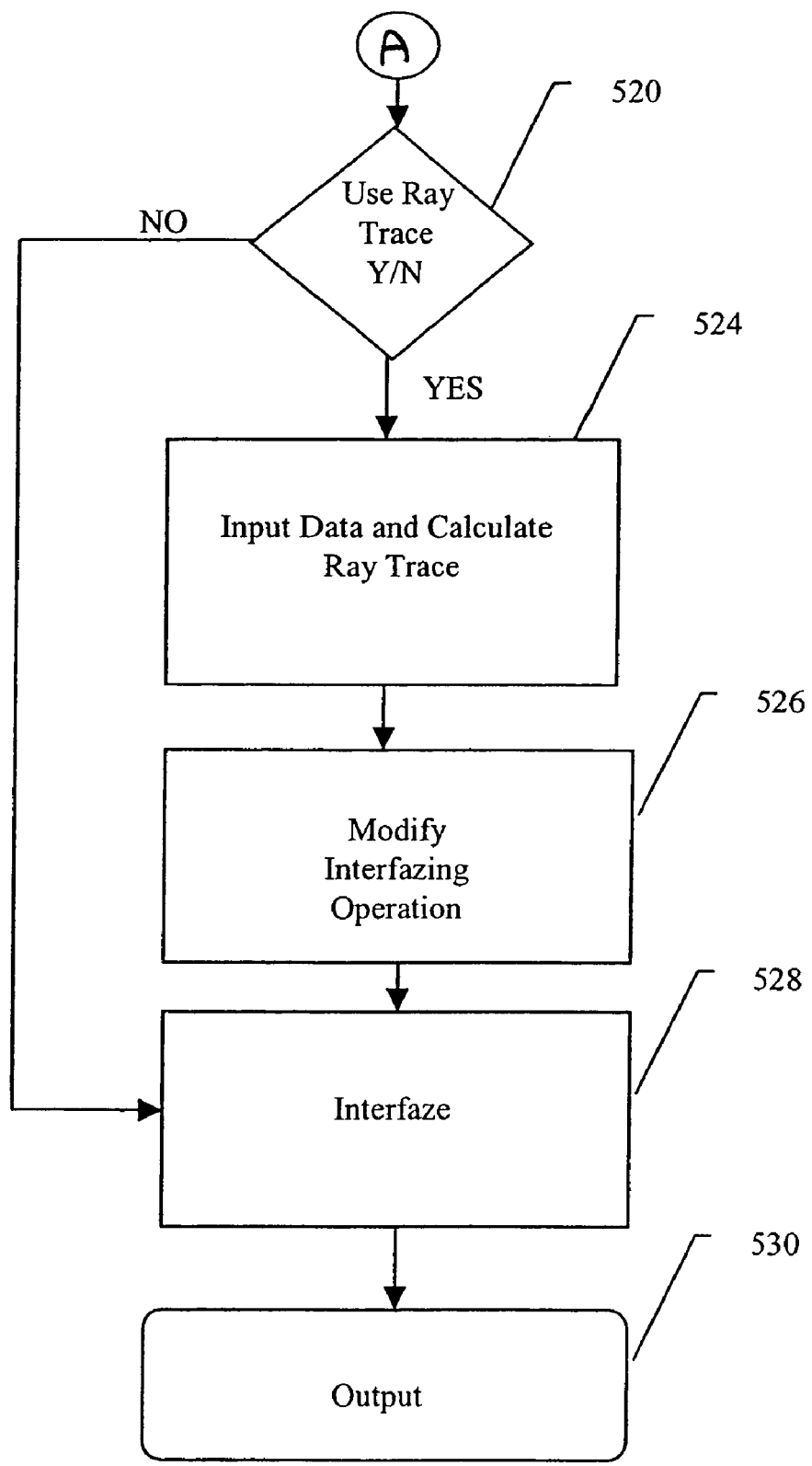

FIGS. 10A and 10B show an example flow diagram of a further aspect of the methods described herein. The features shown by the example flow diagram of FIGS. 10A and 10B contain the above-described features shown by FIG. 2, combined with a feature for generating a layered file LFILE based on the input 2DIMAGE, and for using the LFILE to generate the frames FRM(i) for i=1 to F, either alone or in combination with an ADMAP as described above. One of the further features represented by the example flow diagram of FIGS. 10A and 10B is referenced herein as the "half-back" shift, which overcomes a prior art problem of undesired lateral shifts in images seen through lenticular media, as will be described. Another further feature, referenced herein as "edge safety", compensates for layer shifting performed by the described half back shift operation.

Referring to FIG. 10A, an example operation begins at step 500, which may be identical to operation 200 described in reference to FIG. 2. Next, block 502 selects, typically by way of commands through a GUI such as shown by FIG. 3, between the extracted depth map method 504a and the ADMAP 504b depth map. For purposes of example, it will be assumed that 504a is selected, because the ADMAP feature has been described. Operation 504a begins by extracting regions from the 2DISPLAY, i.e., the 2DIMAGE, and placing these on respective layers of a layered image file LFILE. The LFILE image contains NL layers, the number NL being pre-calculated. The operations for extracting a layered image are known by persons skilled in the arts pertaining to this method and, therefore, a more detailed description of such operations is omitted.

Operation 506 then determines the LPX(j) parallax of each $j^{th}$ one of the NL layers. One method for determining LPX(j) is to generate a VSTEREO pair using left eye and right eye projections of the multiplayer image LFILE, and displaying the VSTEREO in an anaglyph mode as described above. User commands are then received which move layers front and back using, for example a DEPTH SLIDER GUI, as described above. The LPX is referenced as a value relative to the total parallax TPX, the relative value ranging, for example, from "0" to "100". The TPX value is a complex function based on the lens configuration of the lenticular or other micro optical media, the optical properties and dimensions of the material, the intended viewing distance, and the particular printing device Next, operation 508 determines the frame count F as described above. The pixel size FSIZE of each frame FRM(i) is then read from memory or calculated at block 510. The FSIZE is pre-generated, pre-calculated, or calculated as follows: If the FIG. 10B output step 530 uses a direct printer, e.g., an ink jet printer, then step 510 preferably sets the pixel size FSIZE in accordance with the dots per inch DPI resolution of the printer and the frame count F. However, if step 530 uses output devices such as litho, flexo, or digital presses then step 506 sets PSIZE according to the desired results and the INTERFAZE file size. A general guideline for determining PSIZE is start with a standard file output such as, for example, 1880 pixels per inch vertical and 720 pixels per inch horizontal. This is an example file output size, and persons skilled in the arts to which the described inventive methods pertain can readily determine these file sizes for particular lens counts, i.e., LPI, and configurations. Once the starting pixels per inch are identified the following two equations are used to determine the pixel size FSIZE of the printed INTERFAZE file:

$$\text{frame pixel count} = [(\text{finished image } ppi * \text{width})/F], \quad (3)$$

where equation (3) holds for the pixel widths; and frame pixel count must correspond to a whole number. If it is not an integer then various rules can be followed, such as round off or truncation.

$$\text{final pixel vertical pixel count} = [\text{frame pixel height} \times \text{vertical scale factor}], \quad (4)$$

where

The vertical scaling factor may be a bicubic scaling factor, which may be readily varied by persons skilled in the relevant art.

With continuing reference to FIGS. 10A and 10B, operation 514 next generates F frames. Each frame FRM(i) represents a projection of multi-layer images extracted from the 2DISPLAY image, as if viewed from an $i^{th}$ viewing position.

Figure 11:
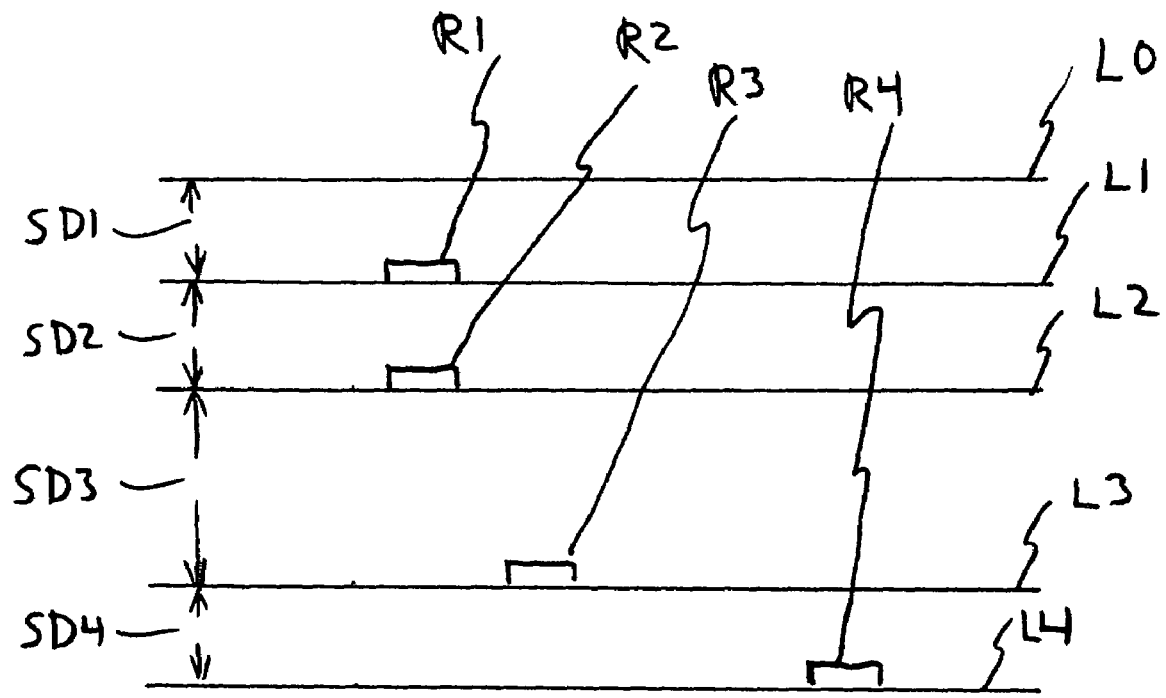
FIG. 11 is a graphical representation of a frame generation operation within example functional block diagram of FIGS. 10A and 10B.
Figure 11:
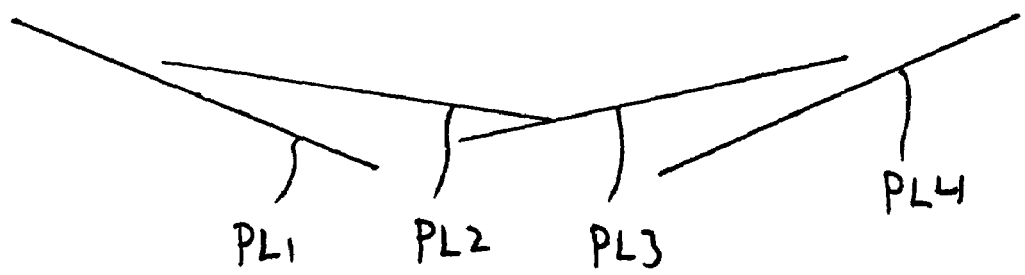

FIG. 11 is a graphical representation of the generation of frames FRM(i), for an example frame count F of four and an example LFILE file having four layers, labeled L1, L2, L3, and L4, and background layer L0. Layer L1 includes a region R1 of an example 2DIMAGE as placed by the FIG. 10A step 504a. Likewise, layers L2 and L3 include regions R2 and R3, respectively. The spacing between the layers L0, L1, L2, L3 and L4, labeled SD1, SD2, SD3 and SD4, respectively, is assumed set by the user according to the anaglyph method described above. The calculation of frame FRM(i) corresponds to the regions R1, R2 and R3 projected onto the projection plane PL1. Likewise, the calculation of frames FRM(2) through FRM(4) corresponds to the regions R1, R2 and R3 projected onto the projection planes PL2 through PL4, respectively. It will be understood that the planes PL1 through PL4 are not drawn to scale Referring to FIGS. 10A and 11, frames FRM(1) and FRM (2) generated by operation 514 can be understood as a first left eye and a first right eye view of the layered image file LFILE. The projection of regions R1 through R3 onto plane PL1 differs from the projection of R1 through R3 onto plane PL2 by a parallax based on the spacing between the layers L1 through L3. Similarly, frames FRM(2) and FRM(3) are a second left eye and right eye image, and FRM(3) and FRM(4) are a third left eye and right eye image.

Referring to FIG. 10A, the "Half Back" shift alignment correction feature identified above is represented by blocks 516 and 518. The Half Back shift compensates for lateral shifting of the apparent position of objects when viewed through the lenticular or other micro optical sheet, the apparent shifting resulting from the parallax shifts performed during the frame generation steps. If the Half Back shift described herein is not performed, objects or features of the original 2DISPLAY may appear misaligned, particularly those in the key subject plane, which is one of the planes in the multi-layer image file FLAYER described below. Such misalignment is a shortcoming in prior art layering methods for lenticular media.

Referring to FIG. 10A, the depicted step 516 receives a HBACK shift command from the user, using a graphical user interface button (not shown) on the FIG. 3 example GUI, or though any other user command input interface. It is assumed for this example that the computer resource 10 performs the described image data processing and, accordingly, the HBACK command is received by the resource 10. Upon receiving the HBACK command, operation 518 calculates a Layer Offset for each layer LY(j) in each frame FRM(i), and then shifts the layer left or right by an amount based on the Layer Offset. Layer Offset can be defined according to the following equation:

$$\text{Layer Offset} = [(TPX \times \text{Frame Number})/(F-1)] - [LPX/2], \quad (5)$$

where
F=frame count or number of frames FRM(i),
TPX=Total Parallax, calculated according to Equation (1),
LPX=Layer Parallax, calculated according to Equation (1),
Frame Number is the "i" index value of the frame reference FRM(i)

Figure 12:
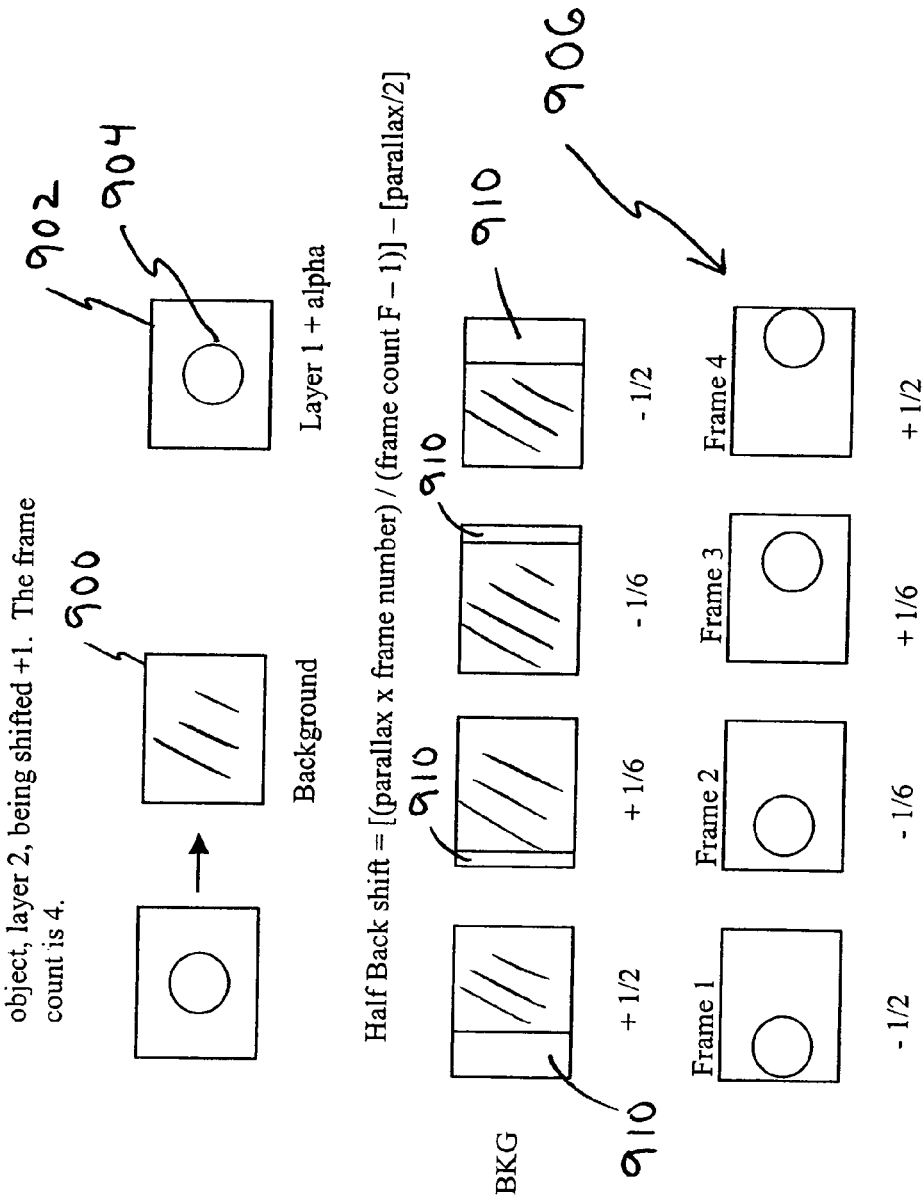
FIG. 12 is a graphical representation of the selective Half Back shift alignment correction feature within the flow diagram of FIGS. 10A and 10B.

FIG. 12 shows an example calculation of the Layer Offset for an example case of two layers, one being the background layer and the other being the foreground layer. Referring to FIG. 12, the example assumes a frame count F of four, a background layer 900, a foreground layer 902, the background being shifted a total of −1 parallax unit and the foreground being shifted a total of +1 parallax unit. The foreground layer has round object 904. Item 906 shows a projection of layer 902, with its alpha channel, and the background 900. The object 904 is in the center position. The shift values are calculated using equation (5) above.

The Half Back shift feature may shift objects in some layers off of the printed field. FIG. 12 shows these shifts as item 910. This can, in some instances, manifest as unwanted visual effects. Referring to FIG. 10A, operation 520 therefore receives a command from the user for using an Edge Safety feature. The Edge Safety fills the areas 910 on FIG. 12 using, for example, a weighted average of neighboring pixels. Operation 520 is not required, as the Edge Safety can be designed into the Half Back shift, with no option for selective use by the user. However, it is contemplated that selective use may be desired and therefore operation 520 is shown.

Referring to FIG. 10B, after operation 514 generates the frames FRM(i), for i=1 to F, a user decision 522 directs the method to proceed directly to 528 and generate an INTERFAZE file according to a predetermined algorithm based on predetermined lens data, as described above, or obtain ray trace information to optimize block 528 for a particular micro optical media or visual effect. Operation 524 is labeled as "Input Data and Calculate Ray Trace", and may be performed on the same computer resource 10 as used to carry out the remaining operations of FIGS. 10A and 10B. The ray trace algorithm may be in accordance with FIG. 9. The results of the operation 524 ray trace are then used by operation 526 to modify the default algorithm interphasing used by block 528. Alternatively, operation 524 may receive the results of a ray trace performed on another computer, either on-site or through a communication channel such as the Internet. Still further, operations 524 and 526 may be combined by, for example, receiving an updated interphasing program. Another variation is to include with a particular micro optical material, or a package of such material, a retrievable information describing ray trace results for the material stored, for example, on a CD ROM.

Figure 13:
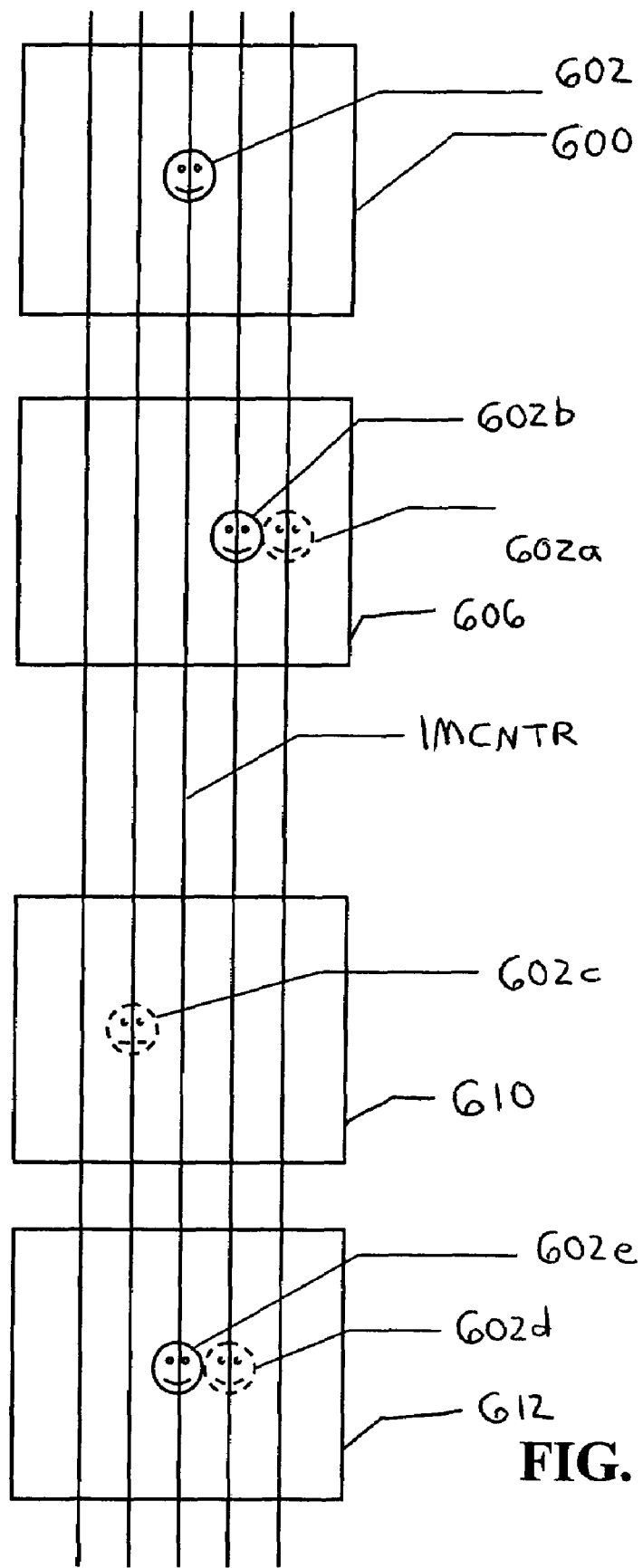
FIGS. 13 depicts a prior art parallax shift and an example shifting performed by the Half Back shift.

FIG. 13 shows a graphical representation of a prior art shifting and a shifting performed by the Half Back shift. Referring to FIG. 13, the top image field 600 shows an original artwork, labeled as 602, at its example original location at the center IMCNTR of the frame. The lower image field 606 shows as 602a the artwork after being shifted one unit, an example being one inch, to the right. Image 602b shows the position at which a user would see the image 602 when he or she views it head on through a lenticular sheet. As can be seen, the position 602b is one half of a unit, being a half-inch for this example, from the original position.

A graphical example of the above-described Half Back Shift is shown in the image fields 610 and 612. First, the Half Back Shift starts with the same original artwork 602 positioned as shown in the image field 600. However, referring to image field 610, instead of only shifting the image 602 as shown by image field 606, the image 602 is first moved back, i.e. to the left, by exactly one half the of the total amount of the parallax shift, to a position in the image field 610 labeled as 602c. Next, the lower image field 612 shows the image 602 after being parallax shifted one unit, i.e., one inch, to the position 602d. Image 602e shows the apparent position of the artwork 602 when viewed head on through a lenticular sheet. The result of the Half Back Shift can be readily seen, in that the apparent position of the artwork 602e is in the center of the image field 612, which is the original position of the original artwork 602 in the image field 600.

Figure 14A:
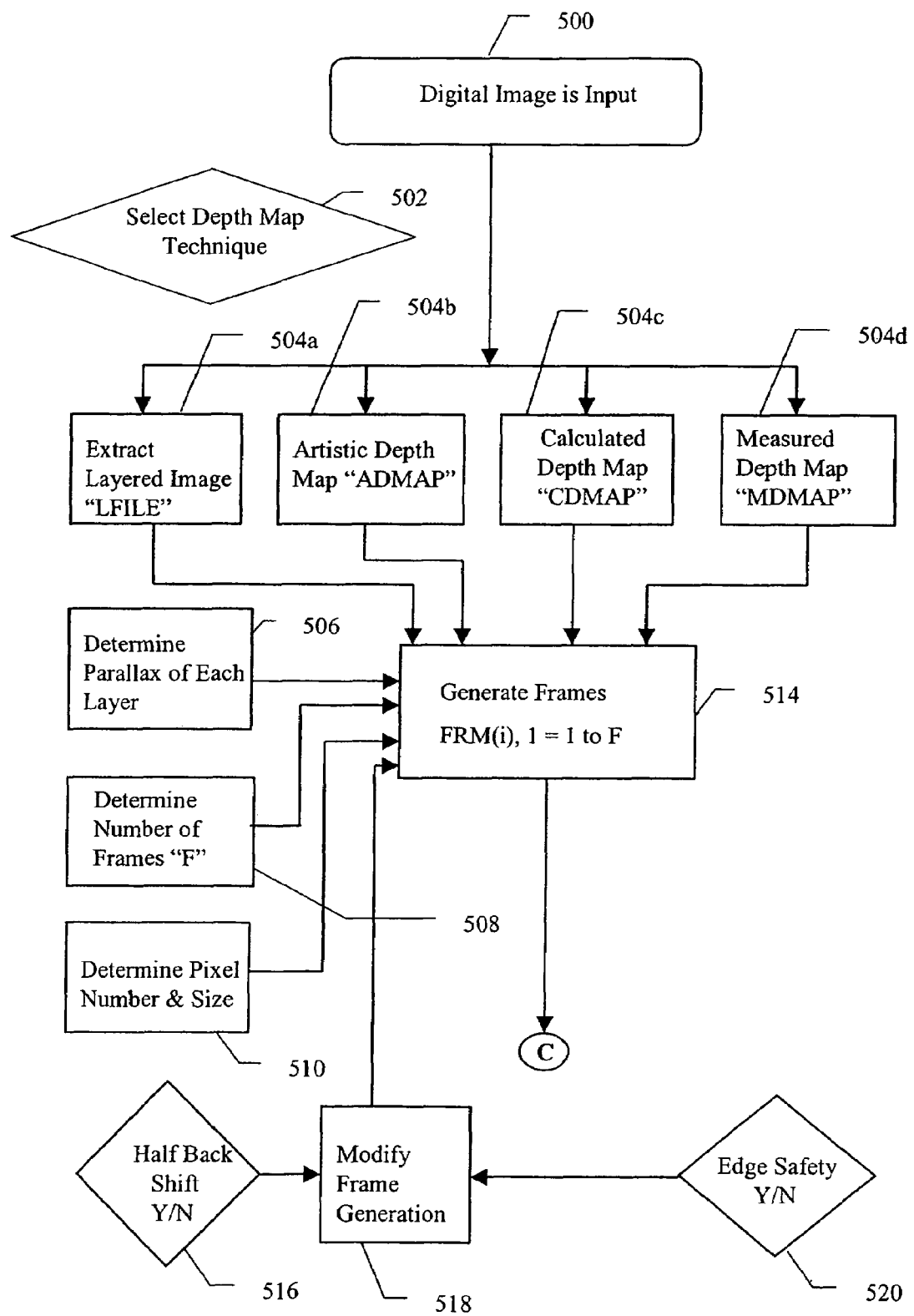
FIGS. 14A and 14B show an example functional block diagram of another aspect, having the functions and arrangements exampled by FIGS. 10A and 10B combined with features of inputting a stereo pair and generating a depth map based on the stereo pair, and inputting a measured depth map.
Figure 14B:
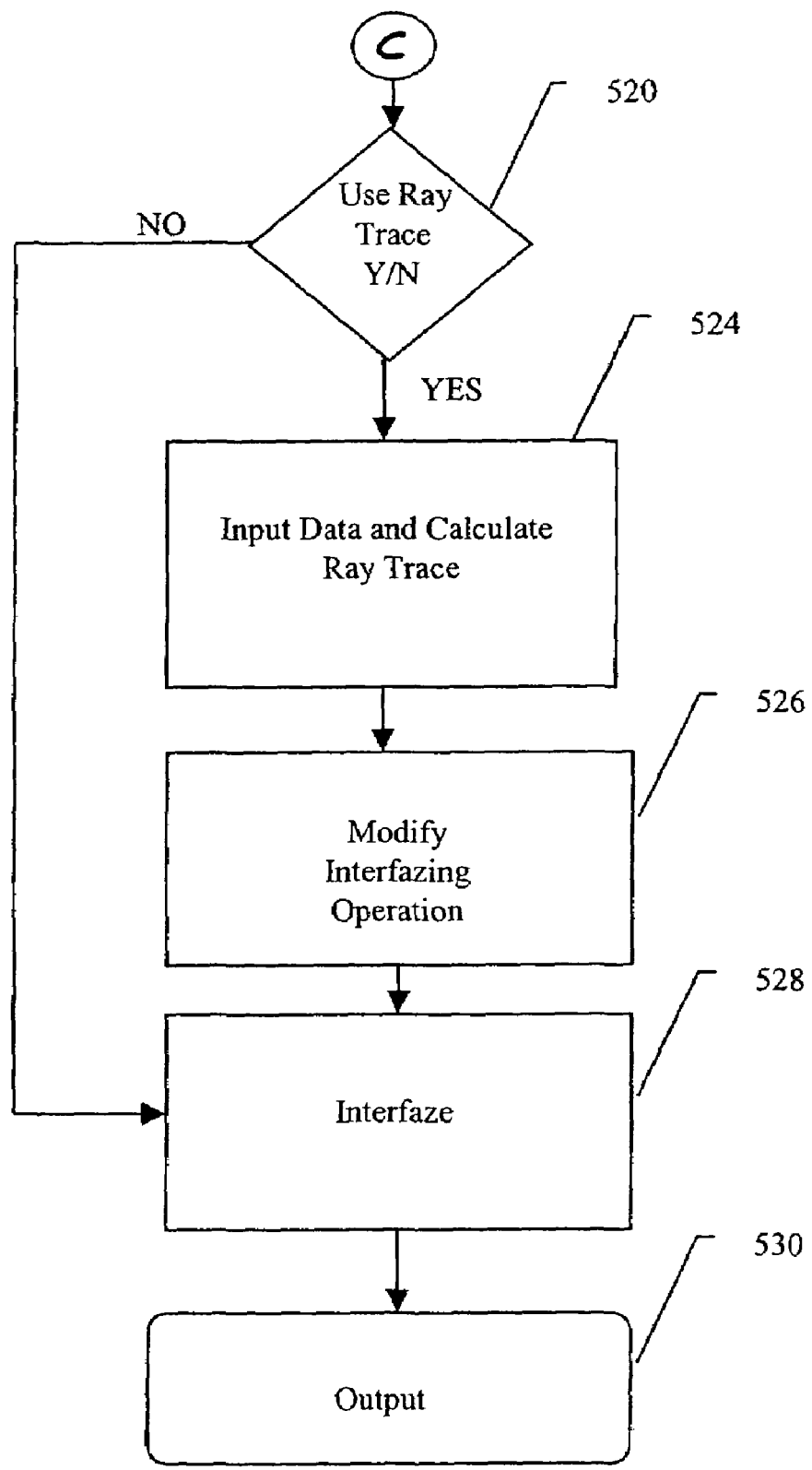

FIGS. 14A and 14B show an example block flow of another aspect. Referring to FIG. 14A, this aspect includes the above described features of FIGS. 10A and 10B, combined with a feature for receiving a stereo image pair VIMAGE and for calculating depth map CDMAP based on the pair, and a feature of receiving a measured depth map MDMAP corresponding to an input 2DIMAGE.

Figure 15:
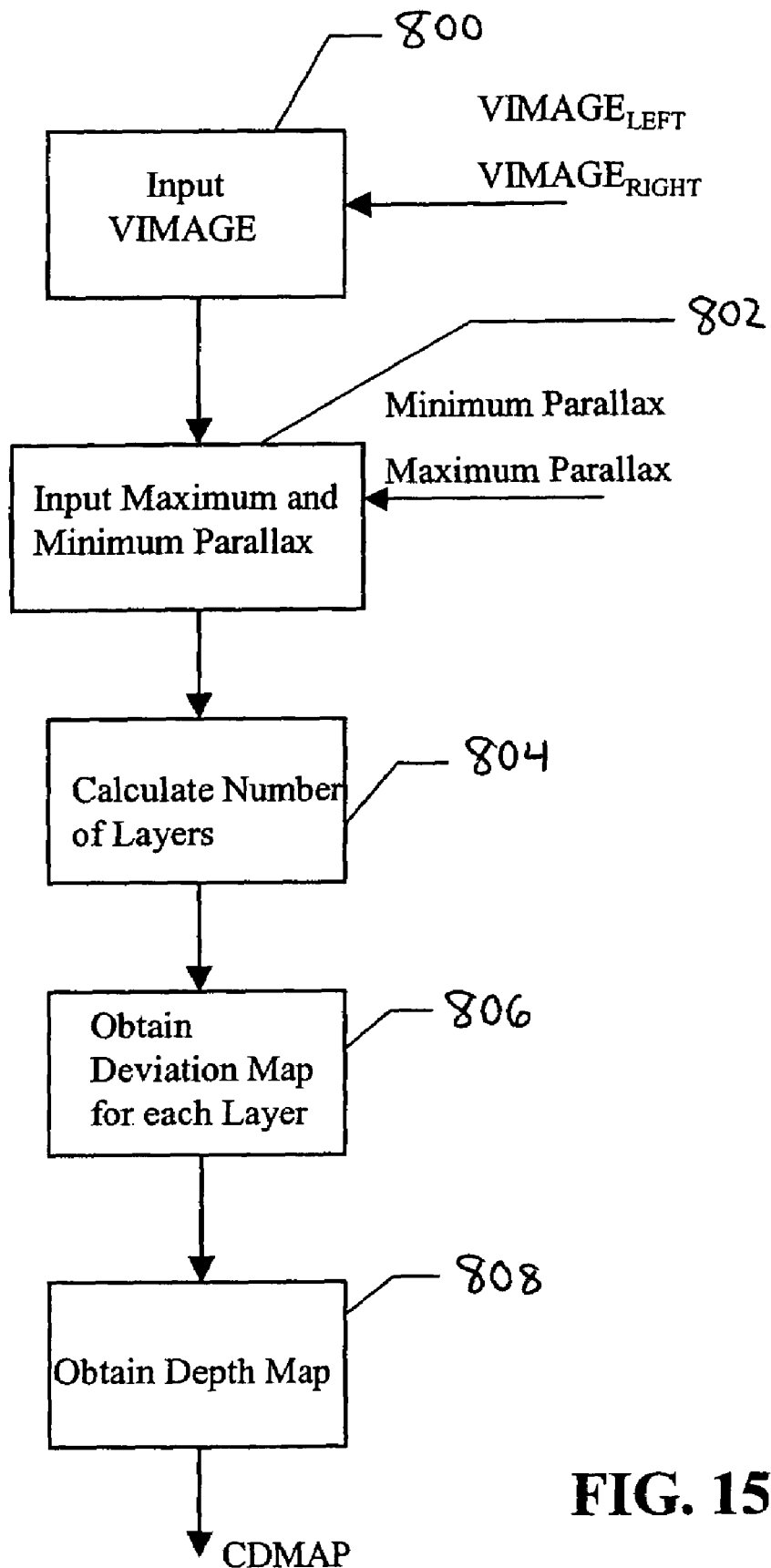
FIG. 15 shows an example flow chart of a calculation of a depth map based on the input stereo image pair.

FIG. 15 shows an example algorithm and process flow by which the computer resource 10 calculates the CDMAP. First, at block 800, the left and right images of the stereo image pair VIMAGE, referenced as $\text{VIMAGE}_{LEFT}$ and $\text{VIMAGE}_{RIGHT}$, respectively, are loaded into the computing resource. Next, at block 802, the user inputs the minimum parallax and the maximum parallax, where the minimum parallax represents the background layer and the maximum parallax represents the foreground layer. The process then calculates at block 804 the total number of layers by subtracting the minimum parallax from the maximum parallax and adding one to the difference.

Next, block 806 obtains one deviation map per depth layer. Each deviation map is obtained as follows: one of the VIMAGE pair, such as the $\text{VIMAGE}_{RIGHT}$ image, is used as a reference. Next, for each pixel of the reference image, i.e., $\text{VIMAGE}_{RIGHT}$, the process compares the value of the pixel to the value of the pixel on the other image, i.e., $\text{VIMAGE}_{LEFT}$, that is N positions to the right of the pixels coordinate in the reference, or $\text{VIMAGE}_{RIGHT}$, image. N is the value of the current testing layer. The process then calculates the absolute value of the difference in the pixel values by, for example, subtracting one pixel value from the other and taking the absolute value of the difference. For example, when testing for the third depth layer, the (0,0) pixel of the $\text{VIMAGE}_{RIGHT}$ is compared to the (3,0) pixel of the left image, and when testing for the second depth layer, the (0,0) pixel of the $\text{VIMAGE}_{RIGHT}$ is compared to the (2,0) pixel of the left image. A deviation map is formed of these pixel differences. It should be noted, in forming the deviation map, that the last M columns of the reference image, where M=the minimum parallax, are discarded and, therefore, it is not necessary to compare these to the left image. Stated, differently, the dimensions of the deviation map cover the overlapping portions of the images.

With continuing reference to FIG. 15, block 808 then obtains the depth map. This is done as follows: For each pixel position of the deviation maps, its smallest value is found. As described, each deviation map represents a depth layer. The correct depth layer for each pixel position is the layer for which the deviation map, for that pixel position, has the smallest deviation value. The layer number is recorded and translated into the scaled range of 0 to 1, the scaled value being the relative depth value for this pixel on the depth map.

Referring to FIGS. 10A and 10B, and to FIGS. 14A and 14B, he measured depth map MDMAP feature may, for example, receive a 2DIMAGE of an automobile, together with an MDMAP describing the depth contour obtained by a laser measuring device. The CDMAP and the MDMAP may be used by the frame generation block 514 to generate frame FRM(i) as described in reference to FIG. 2 block 210.

Further referring to FIGS. 10A and 10B, and to FIGS. 14A and 14B, it will be understood that the frame generation block 514 may use a combination of the layer extraction 594a and any one or more of the ADMAP generated by 504b, the CDMAP calculated at 504c, and the MDMAP received at 504d. For example, the user may "paint" variations in any particular layer of the FLAYER file, and thereby obtain a more rounded, realistic appearing image. A further example is that the user may "paint" desired variations in the CDMAP or MDMAP.

The above-described examples and aspects illustrate significant benefits. Referring to FIG. 2, the user can perform unlimited re-edits of the ADMAP, and see the results in near real time by way of the anaglyph display. Also referring to FIG. 2, the user can isolate the source of problems with respect to processing and printing. The artistic depth map ADMAP provides for rounded, realistic three-dimensional images, either using the ADMAP alone or the ADMAP in combination with a layer extraction, as shown by FIGS. 10A and 10B, and in further combination with one or more of the CDMAP and MDMAP of FIGS. 14A and 14B.

The invention has been described with reference to example embodiments and, therefore, it should be understood that various substitutions, variations, and modifications may be made thereto without departing from the scope of the invention as defined in the appended claims.

Having thus described my invention, what I claim as new and desire to secure by Letters Patent is as follows:

1. A method for converting a two-dimensional (2D) image to a three-dimensional (3D) image for display through a micro optical medium, comprising:
    inputting to a digital computer a 2D file representing a two dimensional image;
    displaying a two-dimensional image corresponding to said 2D file;
    generating with said digital computer a depth map corresponding to said two-dimensional image;
    receiving a user-entered depth command assigning a first depth value to a portion of said depth map corresponding to a first area;
    assigning a second depth value to a portion of said depth map not corresponding to said first area;
    generating with said digital computer a parallax image of said two-dimensional image shifting said first area with respect to an area of said two-dimensional image within said first area, said shifting based on said first depth value and said second depth value;
    displaying an anaglyph image based on said two-dimensional image and said parallax image;
    receiving a user-entered rendering command and, in response, generating with said digital computer a rasterized, interlaced image file including alternating strips of said two-dimensional image and said parallax image for printing on a micro optical media; and
    printing said interlaced image file on said micro optical medium.

2. A method according to claim 1 further comprising:
    receiving a user-entered outlining command identifying said first area of said two-dimensional image.

3. A method according to claim 2 wherein said receiving a user-entered outlining command includes receiving, via a graphical user interface, a trace command identifying an outer peripheral line of said first area.

4. A method according to claim 1 wherein said generating with said digital computer a parallax image of said two-dimensional image includes pre-shifting said first area in a direction opposite a direction of said shifting, such that when said image is viewed through said micro-optical medium it appears at a lateral position substantially co-located with its original position within said image.

5. A method for converting a two-dimensional image to a three-dimensional image for display through a micro optical medium, comprising:
    inputting to a digital computer a 2D file representing a two dimensional image;
    displaying a two-dimensional image corresponding to said 2D file;
    generating with said digital computer a multi-layer information file having information defining a multi-layer image, said defining including establishing a number of layers and a parallax information establishing a distance between at least a first and a second of said layers;
    receiving external commands associating a first area of said two-dimensional image to said first layer of a multi-layer image and associating a second area of said two-dimensional image to said second layer of said multi-layer image;
    generating with said digital computer a first projection of said image of said multi-layered image representing a left eye view and a second projection of said multi-layer image representing a right eye view;
    displaying an anaglyph image based on said first projection and second projection;
    receiving external layer movement commands changing said distance between said first layer and said second layer;
    displaying an updated anaglyph image based on said received layer movement commands;
    generating with said digital computer at least a first frame and a second frame, said first frame representing a projection of said multi-layer image onto a first left eye image plane and said second frame representing a projection of said multi-layer image onto a first right eye image plane;
    generating with said digital computer an interlaced file including alternating strips of said first frame and said second frame; and
    printing said interfaced image file on said micro optical medium.

* * * * *